US007457299B2

(12) United States Patent
Fette et al.

(10) Patent No.: US 7,457,299 B2
(45) Date of Patent: Nov. 25, 2008

(54) DEFINABLE RADIO AND METHOD OF OPERATING A WIRELESS NETWORK OF SAME

(75) Inventors: Bruce Alan Fette, Mesa, AZ (US); Joseph Richard Miller, Paradise Valley, AZ (US); Price Andrew D'Antonio, Phoenix, AZ (US); Mark Lawrence Wormley, Scottsdale, AZ (US); John Huie, Peoria, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 1259 days.

(21) Appl. No.: 10/606,883

(22) Filed: Jun. 25, 2003

(65) Prior Publication Data

US 2004/0264403 A1   Dec. 30, 2004

(51) Int. Cl.
    *H04L 12/54* (2006.01)
(52) U.S. Cl. ...................................... 370/401
(58) Field of Classification Search ............... 370/328, 370/338, 392, 400, 401, 432, 465, 466, 329
    See application file for complete search history.

(56) References Cited

U.S. PATENT DOCUMENTS

| 5,612,948 | A |   | 3/1997  | Fette et al. |
| 5,648,969 | A | * | 7/1997  | Pasternak et al. ........... 370/349 |
| 6,052,600 | A |   | 4/2000  | Fette et al. |
| 6,144,850 | A |   | 11/2000 | Park |
| 6,181,734 | B1 |  | 1/2001  | Palermo |
| 6,757,268 | B1 | * | 6/2004 | Zendle ...................... 370/338 |
| 6,980,537 | B1 | * | 12/2005 | Liu ........................... 370/338 |
| 7,120,456 | B1 | * | 10/2006 | Elliot et al. ................ 455/517 |
| 2004/0246932 | A1 | * | 12/2004 | Fischer ..................... 370/338 |

* cited by examiner

*Primary Examiner*—Wing F. Chan
*Assistant Examiner*—Duc T Duong
(74) *Attorney, Agent, or Firm*—Lowell W. Gresham; Jordan M. Meschkow; Charlene R. Jacobsen

(57) ABSTRACT

A wireless network (100) includes a number of definable radio systems (102) in communication with one another via a wideband backbone (108). Each of the systems (102) includes a first software programmable transceiver (200) for extra-network communication using a narrowband channel defined by a radio frequency capability (106). Each of the radios (102) further includes a second transceiver for intra-network communication using wideband backbone (108). Methods for operating the network (100) enable the radios (102) to engage in communication over narrowband channels to carry a signal between multiple radios (102) and an extra-network location, and for communicating the signal as distinct bitstreams between the radios (102) and another of the radios (102) using the wideband backbone (108). In addition, methods enable the radios (102) to monitor multiple external networks concurrently by having each of the radios (102) use a different RF capability (106), and to combine their independently received signals to improve performance and suppress interference.

34 Claims, 12 Drawing Sheets

| USER NODE /608 | RECEIVER NODE(S) /602 | COMMUNICATION PATH /1002 |
|---|---|---|
| G | A | A–C–G |
| | B | B–C–G |
| | D | D–F–G |
| | E | E–F–G |

DEFINABLE RADIO AND METHOD OF OPERATING A WIRELESS NETWORK OF SAME

TECHNICAL FIELD OF THE INVENTION

The present invention relates to the field of wireless communication networks. More specifically, the present invention relates to a wireless communication network that utilizes multiple radio frequency (RF) capabilities for communication outside of the network.

BACKGROUND OF THE INVENTION

Over recent years, the market for wireless communications has enjoyed tremendous growth. Wireless technology now reaches or is capable of reaching virtually every location on earth. This rapid growth in wireless communication technology and portable computing platforms has led to significant interest in the design and development of instantly deployable, wireless networks often referred to as "ad-hoc networks". Indeed, significant effort has been directed toward optimizing network performance within such ad-hoc networks.

The application of ad-hoc networks spans several different sectors of society. In the civilian sector, an ad-hoc network may be used to interconnect working groups moving in an urban or rural area, in hospital settings, and on a campus engaged in collaborative operations, such as, distributed scientific experiments. In the law enforcement sector, an ad-hoc network may be employed in situations such as crowd control, border patrol, and search and rescue operations. In the military sector, modern communications in a battlefield or in a special operations context require a very sophisticated instant infrastructure with complex requirements and constraints pertaining to network security, capacity, latency, and robustness.

Nodes within an ad-hoc network typically communicate using a single, predetermined, radio frequency (RF) capability that defines a communication channel, modulation technique, bandwidth, security, and so forth. Such RF capabilities can include, for example, satellite communications (SATCOM); single channel ground-to-air radio system (SINCGARS); Enhanced Position Location and Reporting System (EPLRS); Wideband Network Waveform (WNW); very high frequency, frequency modulation (VHF FM); very high frequency, amplitude modulation (VHF AM); APCO 25; mobile user objective system (MUOS), and so forth.

However, in some operational scenarios, commercial and military nodes often need-to communicate, or could benefit by having the capability of communicating, with two or more radio networks external to the ad-hoc network. These external radio networks may communicate using disparate RF capabilities that circumscribe frequency bands (e.g., High Frequency, Very High Frequency, Ultra High Frequency, L-Band, and above), modulation techniques (e.g., Amplitude Modulation, Frequency Modulation, Phase Shift Keying, Quadrature Phase Shift Keying, Binary Phase Shift Keying, Code Division Multiple Access, Time Division Multiple Access, and so forth), lower probability of intercept/detection techniques (e.g., spread spectrum), anti-jamming techniques (e.g., frequency hoping), multi-input/multi-output communications waveforms, and so forth.

In an attempt to facilitate communication with two or more external radio networks having disparate RF capabilities, individuals may be compelled to carry multiple different radios. Alternatively, radios that can switch between similar waveforms, for example, dual-band and tri-band cellular radios may be employed. Other proposed solutions entail the use of software definable radios that allow the radios to switch between waveforms and retune RF sections under software control so that the operator can switch between the external radio networks. Each of these current solutions has operational problems associated with them. Size, weight, power, battery life, cost, and complexity of use are a few of the significant issues.

An ideal solution would be a multiple channel, multiple band, multiple waveform radio that can simultaneously receive and transmit on any network of interest with the power necessary to communicate at long ranges. Unfortunately, such an implementation is not viable in a lightweight form factor, having a battery that would last an acceptable duration, and that can simultaneously transmit and receive on multiple networks without causing interference between channels.

SUMMARY OF THE INVENTION

Accordingly, it is an advantage of the present invention that a definable radio system and method of operating a wireless network of definable radio systems are provided.

It is another advantage of the present invention that a method and apparatus are provided that enable communication with multiple external radio networks operating using disparate RF capabilities.

Another advantage of the present invention is a method and apparatus are provided that enable concurrent communications using disparate RF capabilities.

Yet another advantage of the present invention is that the network of definable radio systems enables communication with multiple external radio networks without penalties in size, weight, or power.

The above and other advantages of the present invention are carried out in one form by a method of operating a wireless network of nodes, the nodes including receiver nodes and a user node. The method calls for defining, for each of the nodes, a narrowband channel for extra-network communication and establishing a wideband backbone for intra-network communication between the nodes. The method further calls for engaging in communication over the narrowband channel at the receiver nodes to carry a signal between the receiver nodes and an extra-network location, and communicating the signal as distinct bitstreams between the receiver nodes and the user node using the wideband backbone.

The above and other advantages of the present invention are carried out in another form by a definable radio system for use in a wireless network. The radio includes a first software programmable transceiver configured for extra-network communication using a narrowband channel defined by a radio frequency (RF) capability, the RF capability being chosen from a group of discrete RF capabilities. The radio further includes a second transceiver configured for intra-network communication over a wideband backbone, and a control processing section in communication with the first and second transceivers. The control processing section enables the first software programmable transceiver to engage in communication over the narrowband channel to carry a signal between the radio and an extra-network location. The control processing section further enables forwarding of the signal as a distinct bitstream over the wideband backbone between the second transceiver and a second definable radio.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

The present invention controls the operation of nodes within a wireless network to enable communication with external networks that communicate using disparate radio frequency (RF) capabilities. In addition, the present invention controls the operation of nodes within the wireless network to increase the quantity of concurrent transmission channels, to increase an effective operating range, and to increase performance in data throughput, all without penalties in size, weight, or power. The invention achieves efficient wireless networking by controlling the selection of signal receive and transmit modes.

Figure 1:
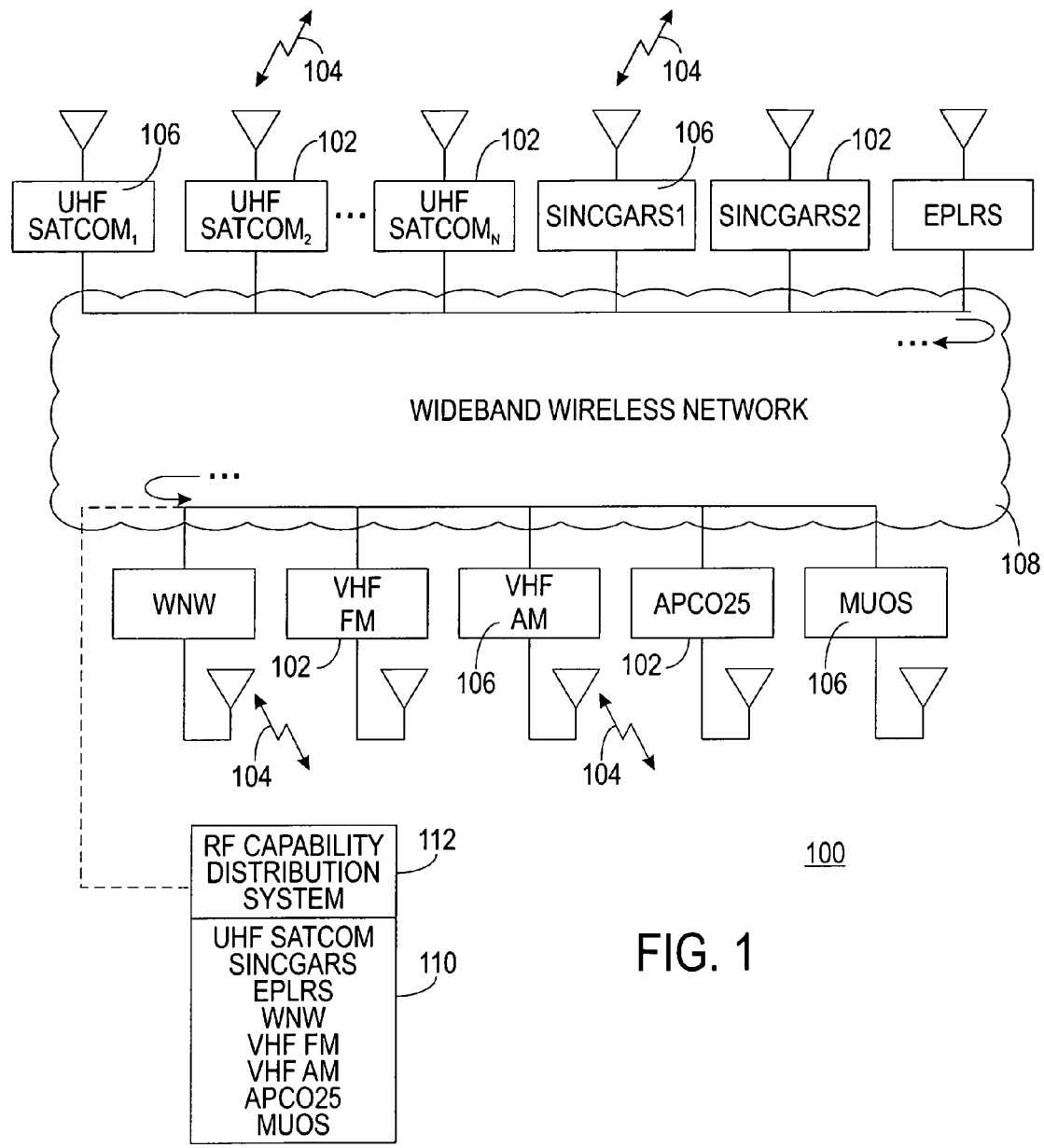
FIG. 1 shows a block diagram of an exemplary wireless network in accordance with a preferred embodiment of the present invention.
Figures 9, 10:
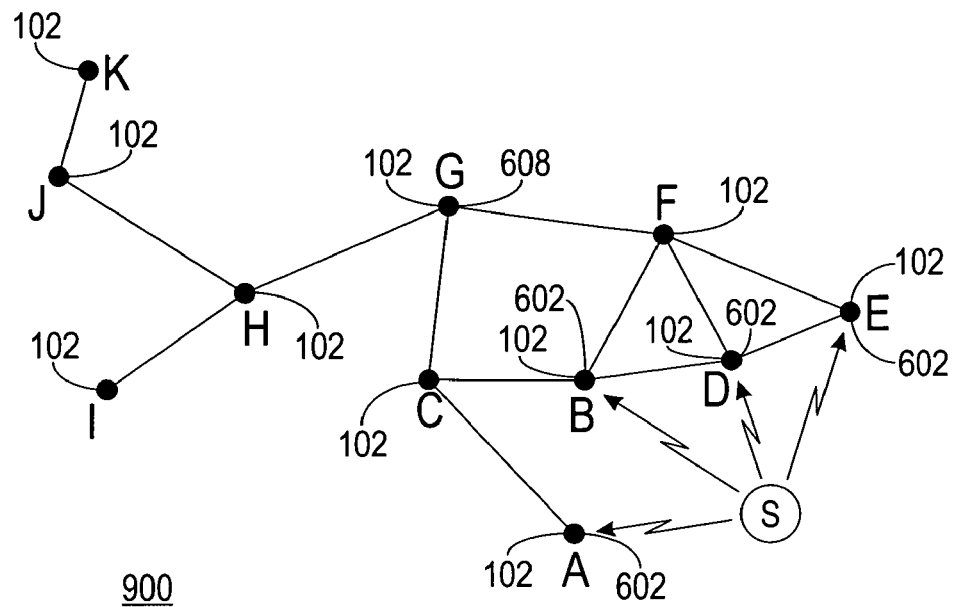
FIG. 9 shows a block diagram of an exemplary network topology graph.
FIG. 10 shows a table of communication paths established between receiving nodes and a user node.

Throughout this discussion, items are assigned three- or four-digit reference numbers whose first digit or first two digits reflects the Figure in which the item first appears. That is, items first appearing in FIG. 1 are assigned reference numbers between 100 and 199, items first appearing in FIG. 10 are assigned reference numbers between 1000 and 1099, etc. Once assigned, a given reference number is used in all Figures in which that item appears.

FIG. 1

FIG. 1 shows a block diagram of an exemplary wireless network 100 in accordance-with a preferred embodiment of the present invention. Exemplary wireless network 100 includes a plurality of nodes 102. Nodes 102 are configured for communication outside of network 100, i.e., extra-network communication, over a narrowband channel 104 defined by a particular radio frequency (RF) capability 106. That is, narrowband channels 104, carry signals between particular ones of nodes 102 and an extra-network location (discussed below). In addition, nodes 102 are configured for communication within wireless network 100, i.e., intra-network communication, over a wide spectrum, i.e., a wideband backbone 108, defined by a broadband network solution. Thus, wideband backbone 108 carries the signals as distinct bit streams between the particular ones of nodes 102 and others of nodes 102 within wireless network 100.

For clarity, the term "extra-network" is used herein to refer to those sources, destinations, or events that are outside of the wireless network of the present invention. Similarly, the term "intra-network" is used herein to refer to those sources, destination, or events that are within the wireless network of the present invention. In addition, the term "narrowband" describes telecommunication that carries information over a specific narrow frequency range defined by a particular one of radio frequency (RF) capabilities 106. In contrast, the term "wideband" refers to telecommunication in which a wide band of frequencies is available to transmit information, thus allowing more information to be transmitted in a given amount of time than that information transmitted over a narrowband channel. Thus, a communications channel over wideband backbone 108 is wider in bandwidth relative to narrowband channel 104.

Nodes 102 are configured for extra-network communication using disparate RF capabilities 106 selected from a group of RF capabilities 110 provided, for example, through an exemplary RF capability distribution system 112. For defense applications, this group of RF capabilities 110 can include, but is not limited to, ultra high frequency, satellite communications (SATCOM); single channel ground-to-air radio system (SINCGARS); Enhanced Position Location and Reporting System (EPLRS); Wideband Network Waveform (WNW); very high frequency, frequency modulation (VHF FM); very high frequency, amplitude modulation (VHF AM); APCO 25; and mobile user objective system (MUOS).

Nodes 102 may be configured to communicate using one of RF capabilities 106 by a number of possible techniques. For example, nodes 102 may be configured prior to establishment of wireless network 100. Alternatively, nodes 102 may be programmed, using wideband backbone 108, with parameters relating to a specific one of RF capabilities 106. Regardless, wireless network 100 can advantageously engage in extra-network communication in accordance with the RF capabilities 106 for which each of nodes 102 is configured.

Wideband backbone 108 of wireless network 108 desirably employs high-speed data transmission and serves as a major access point within the network to which nodes 102 connect. Wideband backbone 108 may be established utilizing an Ultra Wideband modulation technique. Ultra wideband (also known as "UWB radio" or as "digital pulse wireless") is a wireless technology for transmitting large amounts of digital data over a wide spectrum of frequency bands with very low power for a short distance. Ultra wideband radio can carry substantial amounts of data over a distance up to 230 feet at very low power (less than 0.5 milliwatts), and has the ability to carry signals through doors and other obstacles that tend to reflect signals at more limited bandwidths and a higher power.

Ultra wideband broadcasts digital pulses that are timed very precisely on a carrier signal across a very wide spectrum (number of frequency channels) at the same time. The transmitter and receiver must be coordinated to send and receive pulses with an accuracy of trillionths of a second. On any given frequency band that may already be in use, the ultra wideband signal has less power than the normal and anticipated background noise, so theoretically no interference is likely.

Although Ultra Wideband radio is described herein, those skilled in the art will recognize that other current and upcoming broadband technologies may be utilized to form broadband network 110. Other broadband technologies, include for example, the 802.11 standard. The 802.11 standard specifies an over-the-air interface between a wireless client and a base station or between two wireless clients. The 802.11 g specification may be employed within wireless network 100 to provide over twenty megabits per second data rates in the 2.4 GHz band.

In this exemplary scenario, wireless network 100 is an ad-hoc network. As such, each of nodes 102 operates not only as an end-system, but also as a router to forward data packets. Nodes 102 are free to move randomly and organize themselves arbitrarily, and wireless network 100 does not require any fixed infrastructure, such as base stations. Since wireless network 100 does not require any fixed infrastructure, it is an attractive networking option for connecting mobile devices quickly and spontaneously in the civilian sector, the law enforcement sector, and in the military sector. It will become apparent, however, that a wireless network in accordance with the present invention need not be an ad-hoc network, but may instead be a fixed-wireless system.

Wireless network 100 is shown with a variety of nodes 102 configured for operation using a variety of disparate RF capabilities 106 for illustrative purposes only. It will become apparent in the ensuing discussion, that wireless networks, in accordance with the present invention, can be arranged in a myriad of configurations, depending upon the specific capability requirements for the network.

In addition, wireless network 100 may be remotely controlled by a single radio operator to accomplish the specific capability. For example, by sending an appropriate message over wideband backbone 108, the radio operator can configure one or more radios to a new one of RF capabilities 106 (i.e., a waveform or set of waveforms); can arrange for transmit or receive beamforming, can arrange a multiple input/ multiple output (MIMO) transmission, or can arrange a repeater or a transcoder to convert one transmission type to another. Thus, by using wideband backbone 108, one operator can manage the entire wireless network 100 to accomplish multiple objectives, such as, monitoring multiple external networks.

Operationally, the ability to monitor multiple external networks significantly increases operational effectiveness. That is, critical transmissions have a higher probability of receipt within wireless network 100 because more sets can be monitored and there is little or no requirement to switch between wireless networks causing gaps in communication.

FIG. 2

Figure 2:
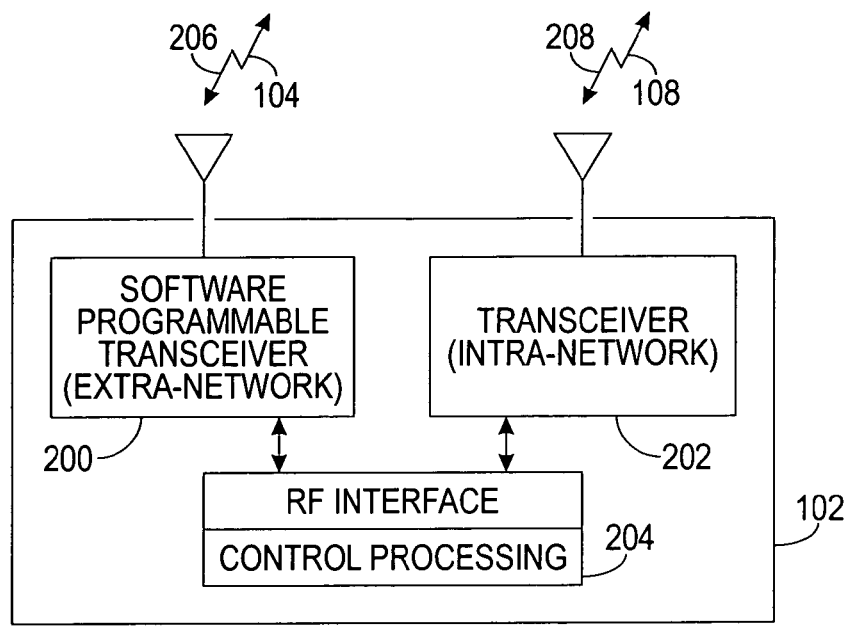
FIG. 2 shows a block diagram of a definable radio operated within the wireless network of FIG. 1.

FIG. 2 shows a block diagram of one of nodes 102 operating within wireless network 100. Generally, node 102 is a definable radio system that includes a first software programmable transceiver 200 configured for extra-network communication using narrowband channel 104, and a second transceiver 202 configured for intra-network communication over wideband backbone 108. An RF interface/control processing section 204 is in communication with each of first and second transceivers 200 and 202, respectively.

First software programmable transceiver 200 is a radio whose channel modulation waveforms are defined in software. Software programmable radios employ a combination of techniques that include multi-band antennas and RF conversion; wideband analog-to-digital and digital-to-analog conversion; and the implementation of intermediate frequency, baseband, and bitstream processing functions in general purpose programmable processors. By using adaptable software and flexible hardware platforms, software programmable radios are able to evolve with technological advances in the wireless industry particularly as waveforms, modulation techniques, protocols, services, and standards change.

In contrast, since transceiver 202 need only engage in intra-network communication, second transceiver 202 need not be a software programmable radio, but may instead, be a fixed hardware device. However, those skilled in the art will recognize that if second transceiver 202 is configured as such, second transceiver 202 may be readily reprogrammed in response to changes in the utilized ultra wideband service.

RF interface/control processing section 204 controls the transfer of signals between first transceiver 200 and second transceiver 202, and to and from node 102. That is, processing section 204 enables forwarding of a signal 206 as a distinct bitstream 208 over wideband backbone 108 between second transceiver 202 and one or more other nodes 102 of wireless network 100. Processor 204 also enables first software programmable transceiver 200 to engage in communication over narrowband channel 104 to carry signal 206 between node 102 and a location outside of wireless network 100.

FIG. 3

Figure 3:
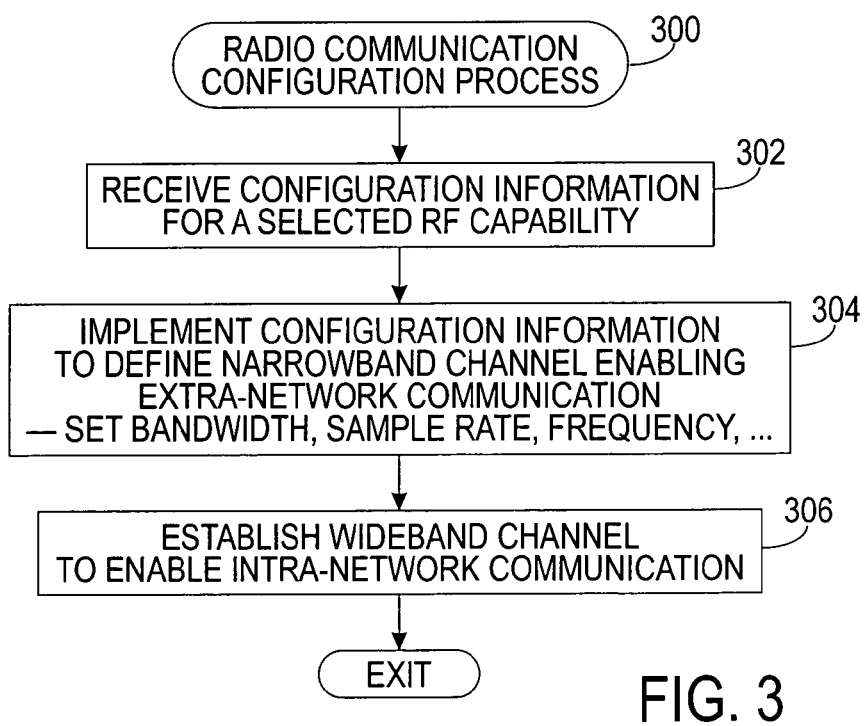
FIG. 3 shows a flow chart of an exemplary radio communication configuration process.

FIG. 3 shows a flow chart of an exemplary radio communication configuration process 300. As discussed above, nodes 102 are configured for extra-network communication using disparate RF capabilities 106 selected from a group of RF capabilities 110. Process 300 functions to communicate configuration information pertaining to a selected one of RF capabilities 106 to each of nodes 102, as dictated by the communication requirements for the network. Thus, process 300 is executed for node 102.

Radio communication configuration process 300 begins with a task 302. At task 302, node 102 receives configuration information for a selected one of RF capabilities 106. In this exemplary scenario, RF capability distribution system 112 maintains configuration information in the form of waveform application routines that define bandwidth, sample rates, frequencies of operation, and so forth for each of RF capabilities 106 and, optionally, wideband backbone 108.

In response, a task 304 implements the configuration information to define a narrowband channel for extra-network communication. That is, the waveform application is disseminated to node 102 to process the related waveform. The bandwidth, sample rates, frequencies of operation, and so forth are set at node 102.

Next, a task 306 establishes wideband backbone 108 to enable intra-network communication. In the instance that second transceiver 202 is a software programmable radio, task 306 implements a waveform application routine, or waveform application update, that defines bandwidth, sample rates, frequencies of operation, and so forth for wideband backbone 108. Following task 306, radio communication configuration process 300 exits.

FIGS. 4 through 7

As discussed above, wireless networks, in accordance with the present invention, can be arranged in a myriad of configurations, depending upon the communication requirements for the network. In order to better highlight the flexibility and advantages of present invention, FIGS. 4-7 show block diagrams of various simplistic wireless network configurations and communication scenarios that may be derived through the execution of radio communication configuration process 300.

FIG. 4

Figure 4:
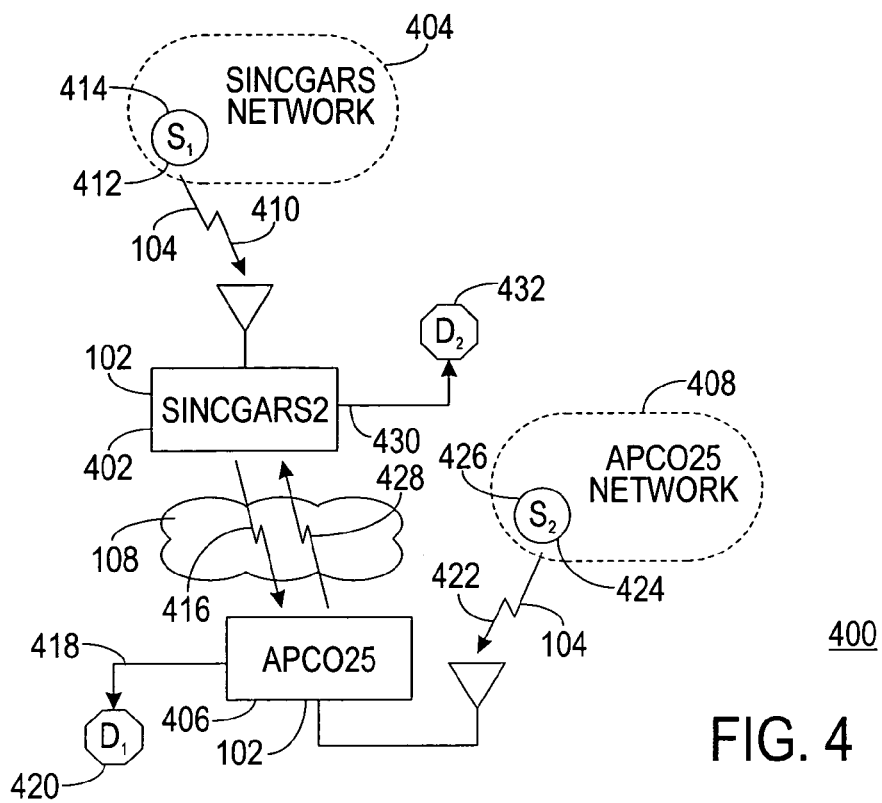
FIG. 4 shows a block diagram of an exemplary wireless network representing the monitoring of two external radio networks operating using disparate RF capabilities.

FIG. 4 shows a block diagram of an exemplary wireless network 400 representing the monitoring of two external radio networks operating using disparate RF capabilities 106. As shown, a first one of nodes 102, referred to herein as a SINCGARS (i.e., single channel ground-to-air radio system) node 402, is configured to communicate via a SINCGARS-based external network 404 (shown in ghost form). Similarly, a second one of nodes 102, referred to herein as an APCO25 node 406, is configured to communicate via an APCO25-based external network 408 (shown in ghost form).

Wireless network 400, SINCGARS-based external network 404, and APCO25-based external network 408 are shown having non-overlapping RF coverage areas for simplicity of illustration. However, it should be readily apparent to those skilled in the art that the RF coverage areas of each of wireless network 400, SINCGARS-based external network 404, and APCO25-based external network 408 are likely to overlap.

In this network configuration, a first signal 410 may be carried over narrowband channel 104 from a first source 412, at an extra-network location 414 within an RF coverage area of SINCGARS-based network 404, to SINCGARS node 402. SINCGARS node 402 performs receive operations described in connection with FIGS. 8-15 to process and forward first signal 410 as a first bitstream 416 over wideband backbone 108 to APCO25 node 406. APCO25 node 406 subsequently performs processing operations described in connection with FIGS. 8-15 to ultimately present a first preferred bitstream 418 of first signal 410 to a first destination 420.

Similarly, a second signal 422 may be carried over narrowband channel 104 from a second source 424, at an extra-network location 426 within an RF coverage area of APCO25-based network 408, to APCO25 node 406. APCO node 406 performs receive operations described in connection with FIGS. 8-15 to process and forward second signal 422 as a second bitstream 428 over wideband backbone 108 to SINCGARS node 402. SINCGARS node 402 subsequently performs processing operations described in connection with FIGS. 8-15 to ultimately present a second preferred bitstream 430 of second signal 422 to a second destination 432.

FIG. 5

Figure 5:
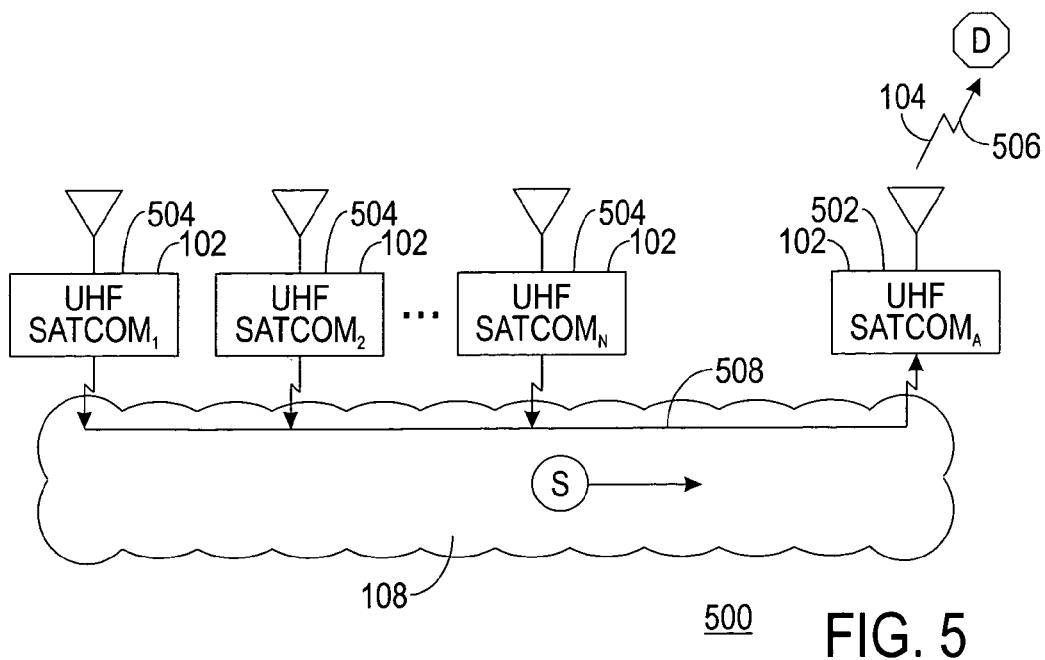
FIG. 5 shows a block diagram of an exemplary wireless network representing the communication of signals via an advantaged node.

FIG. 5 shows a block diagram of an exemplary wireless network 500 representing the communication of a signal via one of nodes 102, referred to herein as an advantaged node 502. Advantaged node 502 is in communication with a team of nodes 102, referred to herein as disadvantaged nodes 504, via wideband backbone 108. Disadvantaged nodes 504 are located in a region having poor RF coverage, such as in areas of heavy foliage or in canyons where the canyon walls may degrade the RF signals to an unacceptable threshold. Thus, disadvantaged nodes 502 may have difficulty in receiving and/or transmitting to an extra-network location. In contrast, advantaged node 502 is positioned at a location, for example, on a hill or in a clearing, at which RF signals are not significantly degraded.

The present invention enables communication between one of disadvantaged nodes 504 and an extra-network location 506 via advantaged node 502. In this exemplary scenario, a signal 506 is communicated as a bitstream 508 from disadvantaged nodes 504 over wideband backbone 108. Advantaged node 504 subsequently performs processing operations described in connection with FIG. 16 to carry signal 506 between advantaged node 504 and an extra-network location 508 over narrowband channel 104.

Although wireless network 500 is shown transmitting signal 506 from advantaged node 502, it should be understood that the present invention enables bi-directional communication of a signal between advantaged node 502 and extra-network locations. As such, a signal received at advantaged node 504 from extra-network location 508 over narrowband channel 104 will be forwarded from advantaged node 504 to the intended disadvantaged nodes 504 via wideband backbone 108.

Advantaged node 502 and disadvantaged nodes 504 are all shown configured as being configured for UHF SATCOM RF capability 106 for simplicity of illustration. However, advantaged and disadvantaged nodes 502 and 504 need not be UHF SATCOM. Furthermore, advantaged and disadvantaged nodes 502 and 504 need not all be configured for the same RF capability 106.

FIG. 6

Figure 6:
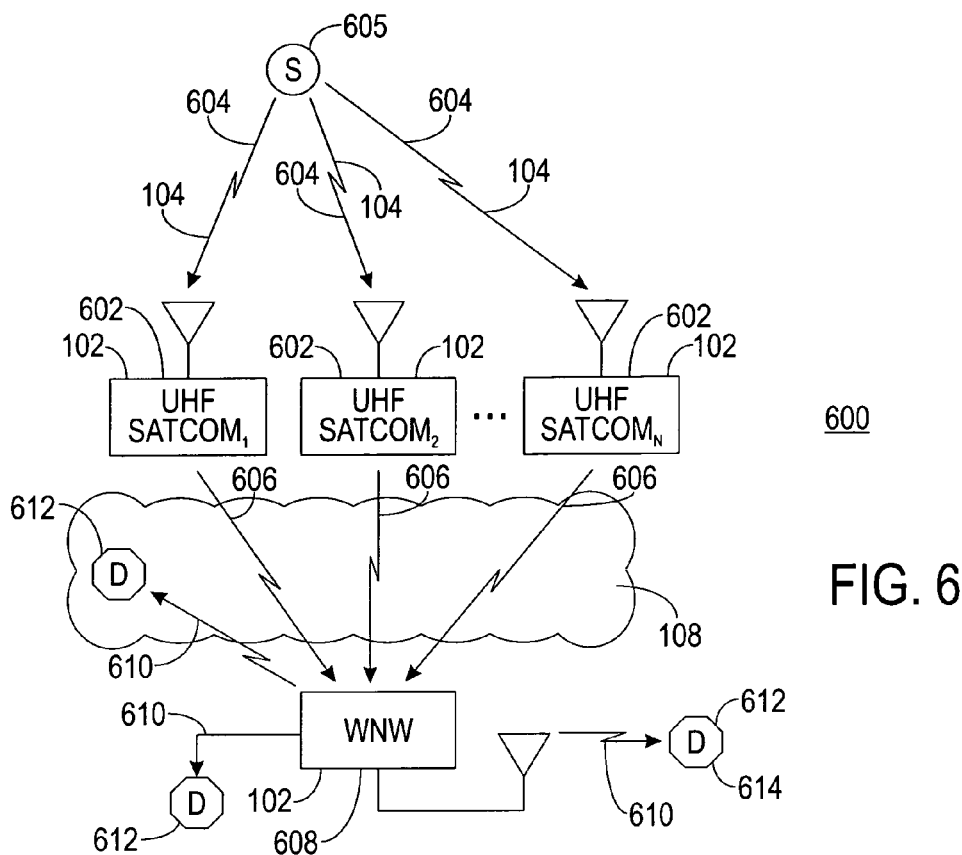
FIG. 6 shows a block diagram of an exemplary wireless network representing a phased receiving operational scenario.

FIG. 6 shows a block diagram of an exemplary wireless network 600 representing a phased receiving operational scenario. Wireless network 600 includes nodes 102, referred to hereinafter as receiving nodes 602, each of which are configured to monitor for and receive a source signal 604 over narrowband channel 104 from an extra-network source 605. Source signal 604 is forwarded as distinct bitstreams 606 over wideband backbone 108 to an intended one of nodes 102, referred to hereinafter as a user node 608. User node 608 subsequently performs processing to ultimately present a preferred bitstream 610 of source signal 604 to a destination 612.

Destination 612 is illustrated at three locations within FIG. 6 to indicate that destination 612 may be another of nodes 102 within wireless network 600, destination 612 may be components associated with user node 608, or destination 612 may be an extra-network location 614.

Phased receiving may be performed when any single one of nodes 102 has difficulty receiving signal 604. In such a situation, the quality of service (QOS) may drop below an acceptable threshold and the information may be unusable. By combining receive resources (i.e., the number of nodes 102 configured to receive signal 604), QOS can be significantly increased, as discussed in connection with FIGS. 8-15.

FIG. 7

Figure 7:
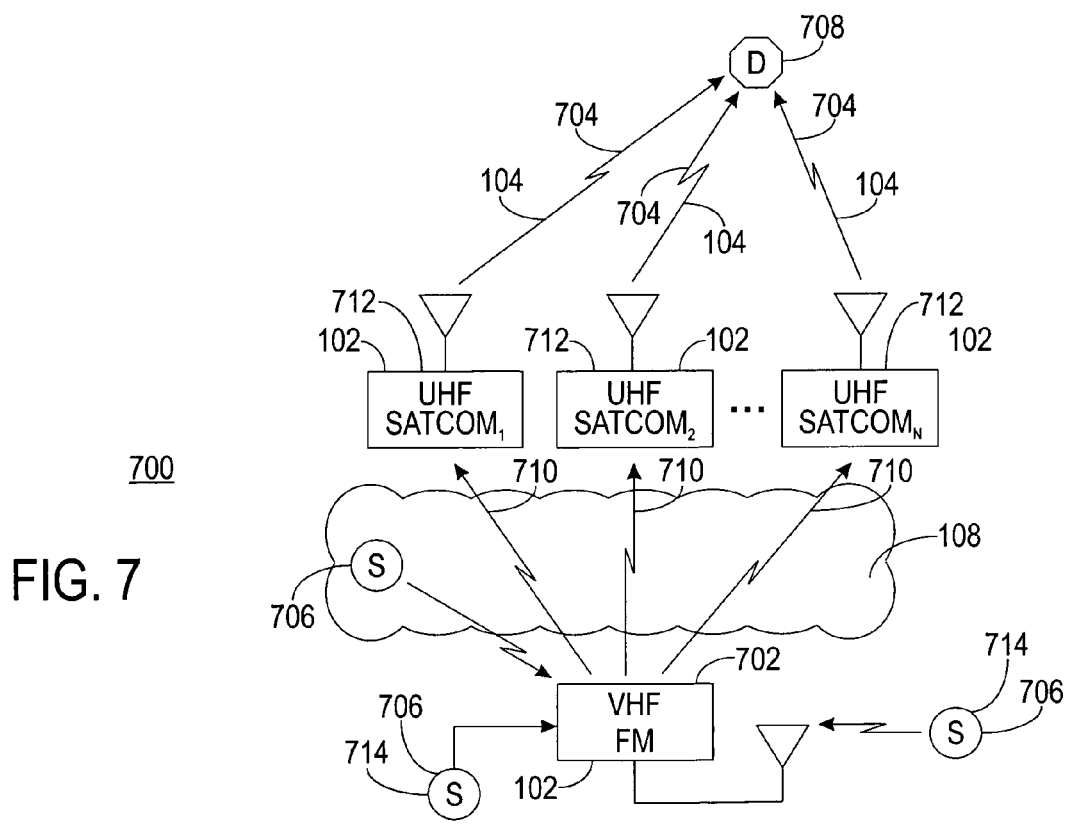
FIG. 7 shows a block diagram of an exemplary wireless network representing a phased transmitting operational scenario.

FIG. 7 shows a block diagram of an exemplary wireless network 700 representing a phased transmitting operational scenario. Wireless network 700 includes one of nodes 102, referred to hereinafter as a user node 702, configured to communicate a source signal 704 from a source 706 to an extra-network location 708. User node 702 forwards source signal 704 as distinct bitstreams 710 over wideband backbone 108 for receipt at each of a number of intended nodes 102. In the context of wireless network 700, these intended nodes 102 are "receiving nodes" because they "receive" bitstreams 710 from user node 702. However, in the larger context of extra-network communications, these intended nodes 102 "transmit" source signal 704 to extra-network location 708. As such, nodes 102 are referred to hereinafter as transmitting nodes 712.

Source 706 is illustrated at three locations within FIG. 7 to indicate that source 706 may be another of nodes 102 within wireless network 700, source 706 may be components associated with user node 702, or source 706 may be an extra-network location 714.

Phased receiving may be performed when any single one of nodes 102 has difficulty transmitting signal 704 at an acceptable signal threshold and the information may be unusable or undetectable at extra-network location 708. By combining transmit resources (i.e., the number of nodes 102 configured to transmit signal 704), QOS can be significantly increased, as discussed in connection with FIG. 16.

The block diagram of FIG. 7 also represents an inverse multiplex operational scenario. In an inverse multiplex operational scenario, user node 702 has a large amount of data to be transmitted, such as might occur with image transmission. In such a case, one of narrowband channels 104 may be insufficient for delivering the image data in a timely fashion. User node 702 can choose to arrange for multiple narrowband channels 104 and/or networks to operate in parallel to deliver the image data. User node 702 partitions source signal 704 into multiple data streams, i.e., distinct bitstreams 710. Distinct bitstreams 710 may be sent separately from user node 702 to transmitting nodes 712 over wideband backbone 108, and is subsequently transmitted by multiple transmitting nodes 712, possibly via different networks.

At extra-network location 708, or another site in communication with communication equipment at location 708, the partitioned source signals 704 are received, demodulated, and delivered to a multiplexer (not shown) that assembles the partitioned source signals 704 to create the original composite source signal 704.

The inverse multiplex operational scenario enables source signal 704 to be partitioned to match the approximate throughput of each of the utilized narrowband channels 104. In addition, the partitioned source signal can be adaptive so that if one of narrowband channels 104 becomes corrupted, experiences packet drops or excessive bit errors, or the channel drops, the bit rate of that narrowband channel 104 can be reallocated appropriately amongst the others, or the forward error correction is adapted. Furthermore, if an additional one of narrowband channels 104 opens up, source signal 704 can be redistributed, i.e., re-partitioned, to take advantage of the additional available one of narrowband channels 104.

Yet another option with the inverse multiplex operational scenario is to send different blocks of source signal 704 to different radio networks all at the same time, such as, a small image to a network that supports low data rate, and a high resolution image to a network that supports high data rate.

FIG. 8

Figure 8:
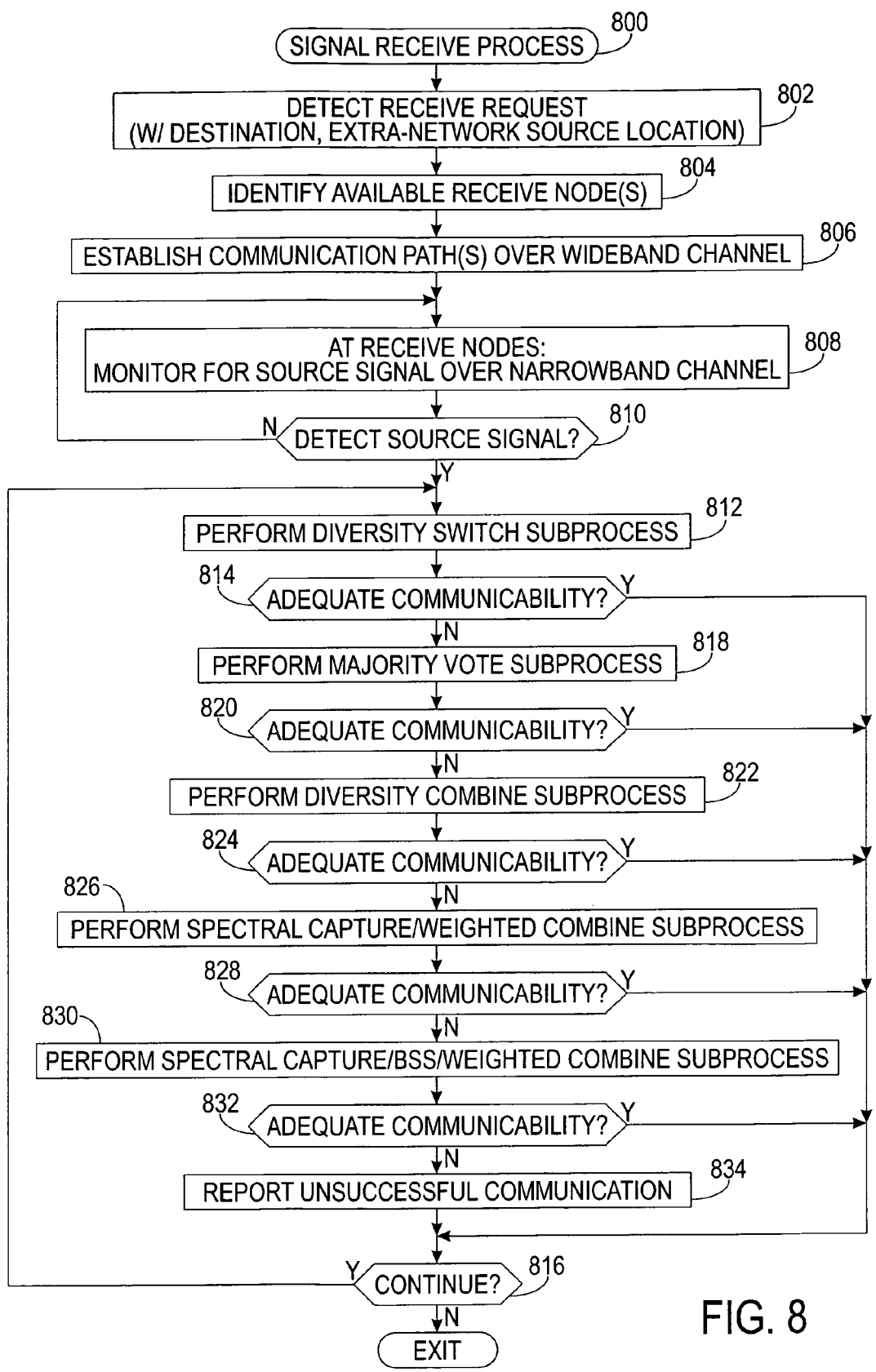
FIG. 8 shows a flow chart of a signal receive process in accordance with the present invention.

FIG. 8 shows a flow chart of a signal receive process 800 in accordance with the present invention. The operations of signal receive process 800 will be described utilizing wireless network 600 as an example. However, the present teaching can be applied to wireless networks 100, 400, 500, and 700 as well. Signal receive process 800 enables the receipt of signal 604 over narrowband channel 104, and the selective processing and combining of distinct bitstreams 606 from one or more receiving nodes 602, and the presentation of preferred bitstream 610 to destination 612. The object of signal receive process 800 is to enhance QOS while minimizing the load on wideband backbone 108.

Subprocess 800 begins at a task 802 when a receive request is detected over wideband backbone 108. The receive request may have been issued by destination 612, user node 608, or a control node (not shown) that manages communications within wireless network 600. The receive request may contain a particular RF capability 106, in this case UHF SATCOM. In addition, the receive request may contain addressing for destination 612 and location information pertaining to extra-network source 605, or an RF coverage area in which extra-network source 605 may be located.

A task 804, performed in connection with task 802 identifies available receiving nodes 602. These available receiving nodes 602 are those nodes 102 whose first software programmable transceiver 200 are currently configured for the particular RF capability 106 (UHF SATCOM). In addition, these available receiving nodes 602 are those nodes that are likely to be within RF range of extra-network source 605.

Once receiving nodes 602 have been identified at task 804, a task 806 establishes communication paths over wideband backbone 108.

FIG. 9

Referring to FIG. 9 in connection with task 806, FIG. 9 shows a block diagram of an exemplary network topology graph 900. Per conventional wireless network techniques, nodes 102 within wireless network 600 can communicate directly with neighbor nodes in their direct transmission range over wideband backbone 108. In addition, nodes 102 may communicate with distant nodes 102 through a chain of intermediate nodes 102 (a.k.a., routers). In an ad-hoc network, this network topology graph may frequently change since nodes 102 are free to move randomly and organize themselves arbitrarily. Network topology graph 900 illustrates this current, specific physical (i.e., real) or logical (i.e. virtual) arrangement of nodes 102 within a wireless network, in this case wireless network 600.

As shown, network topology graph 900 illustrates those nodes 102 that are in direct communication and in communication with distant nodes 102 through a chain of intermediate nodes 102. One of nodes 102, labeled "G" is user node 608. In addition, four of nodes 102, labeled "A", "B", "D", and "E", are identified as available receiving nodes 602 due to their proximity to extra-network source 605.

Each of nodes 102 within wireless network 600 typically maintains a database describing network topology graph 900 of wireless network 600. From this database, a routing table is periodically generated for establishing communication paths over wideband backbone 108 and routing data packets between nodes 102.

FIG. 10

FIG. 10 shows an exemplary routing table 1000 of communication paths 1002 established between receiving nodes 602 and user node 608 in accordance with network topology graph 900. In this, instance, there are four communication paths 1002 established between each of four receiver nodes 602 to user node 608.

In a preferred embodiment, user node 602 is defined to be a closest common node to each of receiver nodes 602 along communication paths 1002. That is, each of communication paths 1002 includes user node 602 as an intermediate node between receiver nodes 602 and destination 612. Processes that determine preferred bitstream 610 are performed at the closest common node to minimize the network load on wideband backbone 108.

FIG. 8 (continued)

With reference back to signal receive process 800, following the establishment of communication paths 1002 over wideband backbone 108, a task 808 instructs each of receiving nodes 602 to monitor for source signal 604 over narrowband channel 104. As such, each of receiving nodes 602 is prepared to detect energy over narrowband channel 102 that meets or exceeds predetermined minimum detection levels.

A query task 810 performed at each of receiving nodes 602 is executed in connection with task 808. Query task 810 determines whether source signal 604 is detected. When source signal 604 is not detected, program control loops back to task 808 to continue monitoring for source signal 604. However, when source signal 604 is detected, program control proceeds to a task 812. The ensuing tasks of signal receive process 800 provide multiple modes or methods for receiving source signal 604 and communicating source signal within wireless network 600 in response to the quality of the received source signal 604 at receiving nodes 602. Each of the methods for receiving source signal 604 progressively increase the load on wideband backbone 108 of wireless network 600. Thus, a higher quality source signal 604 results in a lower load on wideband backbone 108 of wireless network 600.

Task 812 initiates the execution of a diversity switch subprocess to determine preferred bitstream 610. In general, the diversity switch subprocess enables user node 608 to select a strongest source signal 604 available received at receiving nodes 602 and present preferred bitstream 610 to destination 612. The diversity switch subprocess will be described in connection with FIG. 11.

In response to the execution of task 812, a query task 814 determines whether adequate communicability was achieved. In other words, query task 814 determines whether preferred bitstream 610 could be determined in response to the execution of the diversity switch subprocess. When query task 814 determines that preferred bitstream 610 could be determined and presented to destination 612, program control proceeds to a query task 816.

Query task 816 determines, whether signal receive process 800 for detected source signal 604 is to continue. Receive process 800 may continue by repeating/continuing the diversity select subprocess at pre-determined baud intervals. Alternatively, receive process 800 may continue for a pre-determined period of time and/or upon continued detection of source signal 604. Regardless of the decision making criteria for continued receiving, when receive process 800 is to continue, process control loops back to task 812. When receive process 800 is to be discontinued, process 800 exits.

Referring back to query task 814 when the determination is made that an attempted execution of the diversity select subprocess results in inadequate communicability of source signal 604 to destination 612, receive process 800 proceeds to a task 818.

Task 818 initiates the execution of a majority vote subprocess to determine preferred bitstream 610. In general, the majority vote subprocess enables user node 608 perform majority voting of received distinct bitstreams 606 to identify source signal 604, and present preferred bitstream 610 to destination. The majority vote subprocess will be described in connection with FIG. 12.

In response to the execution of task 818, a query task 820 determines whether adequate communicability was achieved. In other words, query task 820 determines whether preferred bitstream 610 could be determined in response to the execution of the majority vote subprocess. When query task 818 determines that preferred bitstream 610 could be determined and presented to destination 612, program control proceeds to query task 816 to determine whether signal receive process 800 for detected source signal 604 is to continue.

Receive process 800 may continue by repeating/continuing the majority vote subprocess at pre-determined baud intervals. Alternatively, receive process 800 may continue for a pre-determined period of time and/or upon continued detection of source signal 604. Regardless of the decision making criteria for continued receiving, when receive process 800 is to continue, process control loops back to task 812, or alternatively to task 818 for continued execution of the majority vote subprocess.

Referring back to query task 820 when the determination is made that an attempted execution of the majority vote subprocess results in inadequate communicability of source signal 604 to destination 612, receive process 800 proceeds to a task 822.

Task 822 initiates the execution of a diversity combine subprocess to determine preferred bitstream 610. The diversity combine subprocess enables user node 608 to combine multiple distinct bitstreams 606 from multiple receiving nodes 602 until acceptable signal quality criteria are satisfied to determine preferred bitstream 610, which is then presented to destination 612. The diversity combine subprocess will be described in connection with FIG. 13.

In response to the execution of task 822, a query task 824 determines whether adequate communicability was achieved. In other words, query task 824 determines whether preferred bitstream 610 could be determined in response to the execution of the diversity combine subprocess. When query task 824 determines that preferred bitstream 610 could be determined and presented to destination 612, program control proceeds to query task 816 to determine whether signal receive process 800 for detected source signal 604 is to continue.

Receive process 800 may continue by repeating/continuing the diversity combine subprocess at pre-determined baud intervals. Alternatively, receive process 800 may continue for a pre-determined period of time and/or upon continued detection of source signal 604. Regardless of the decision making criteria for continued receiving, when receive process 800 is to continue, process control loops back to task 812, or alternatively to task 822 for continued execution of the diversity combine subprocess.

Referring back to query task 824 when the determination is made that an attempted execution of the diversity combine subprocess results in inadequate communicability of source signal 604 to destination 612, receive process 800 proceeds to a task 826.

Task 826 initiates the execution of a spectral capture/weighted combine subprocess to determine preferred bitstream 610. The spectral capture/weighted combine subprocess enables user node 608 to weight and combine information spectrums received at receiving nodes 602 and forwarded to user node 608, prior to acquisition, tracking, demodulating signal 604, and presenting preferred bitstream 610 to destination 612. The spectral capture/weighted combine subprocess will be described in connection with FIG. 14.

In response to the execution of task 826, a query task 828 determines whether adequate communicability was achieved. In other words, query task 828 determines whether preferred bitstream 610 could be determined in response to the execution of the spectral capture/weighted combine subprocess. When query task 824 determines that preferred bitstream 610 could be determined and presented to destination 612, program control proceeds to query task 816 to determine whether signal receive process 800 for detected source signal 604 is to continue.

Receive process 800 may continue by repeating/continuing the spectral capture/weighted combine subprocess at pre-determined baud intervals. Alternatively, receive process 800 may continue for a pre-determined period of time and/or upon continued detection of source signal 604. Regardless of the decision making criteria for continued receiving, when receive process 800 is to continue, process control loops back to task 812, or alternatively to task 826 for continued execution of the spectral capture/weighted combine subprocess.

Referring back to query task 828 when the determination is made that an attempted execution of the spectral capture/weighted combine subprocess results in inadequate communicability of source signal 604 to destination 612, receive process 800 proceeds to a task 830.

Task 830 initiates the execution of a spectral capture/blind signal separation (BSS) weighted combine subprocess to determine preferred bitstream 610. The spectral capture/BSS/weighted combine subprocess enables user node 608 to distinguish source signal 604 from interference in information spectrums received at receiving nodes 602 and forward to user node 608, and weight and combine the information spectrums prior to acquisition, tracking, demodulating signal 604, and presenting preferred bitstream 610 to destination 612. The spectral capture/BSS/weighted combine subprocess will be described in connection with FIG. 15.

In response to the execution of task 830, a query task 832 determines whether adequate communicability was achieved. In other words, query task 832 determines whether preferred bitstream 610 could be determined in response to the execution of the spectral capture/BSS/weighted combine subprocess. When query task 832 determines that preferred bitstream 610 could be determined and presented to destination 612, program control proceeds to query task 816 to determine whether signal receive process 800 for detected source signal 604 is to continue.

Receive process 800 may continue by repeating/continuing the spectral capture/BSS/weighted combine subprocess at pre-determined baud intervals. Alternatively, receive process 800 may continue for a pre-determined period of time and/or upon continued detection of source signal 604. Regardless of the decision making criteria for continued receiving, when receive process 800 is to continue, process control loops back to task 812, or alternatively to task 830 for continued execution of the spectral capture/BSS/weighted combine subprocess.

Referring back to query task 832 when the determination is made that an attempted execution of the spectral capture/BSS/weighted combine subprocess results in inadequate communicability of source signal 604 to destination 612, receive process 800 proceeds to a task 834.

Task 834 reports an unsuccessful receive communication attempt to destination 612. Following task 834, process 800 proceeds to task 816 to determine whether receive process 800 should be continued. When receive process 800 is to continue, process control loops back to task 812, or alternatively to task 832 for continued execution of the spectral capture/BSS/weighted combine subprocess. When receive process 800 is to be discontinued, process 800 exits.

FIGS. 11 through 15

Each of the subprocesses of FIGS. 11-15 describe a receive mode for receiving source signal 604 and presenting source signal 604 as preferred bitstream 610 to destination 612. It will become readily apparent that each of the receive modes presented in FIGS. 11-15 places an increasing load on wideband backbone 108 of network 600. Several of the subprocesses perform similar operations when receiving signal 604 and presenting preferred bitstream 610. However, the subprocesses are separately described below for clarity of illustration.

In addition, as shown in each of FIGS. 11-15, dashed lines delineate those operations performed at each of receiving nodes 602, and those operations performed at user node 608. The operations performed at each of receiving nodes 602 will be described in connection with occurring at a single receiving node 602 for clarity of discussion.

FIG. 11

Figure 11:
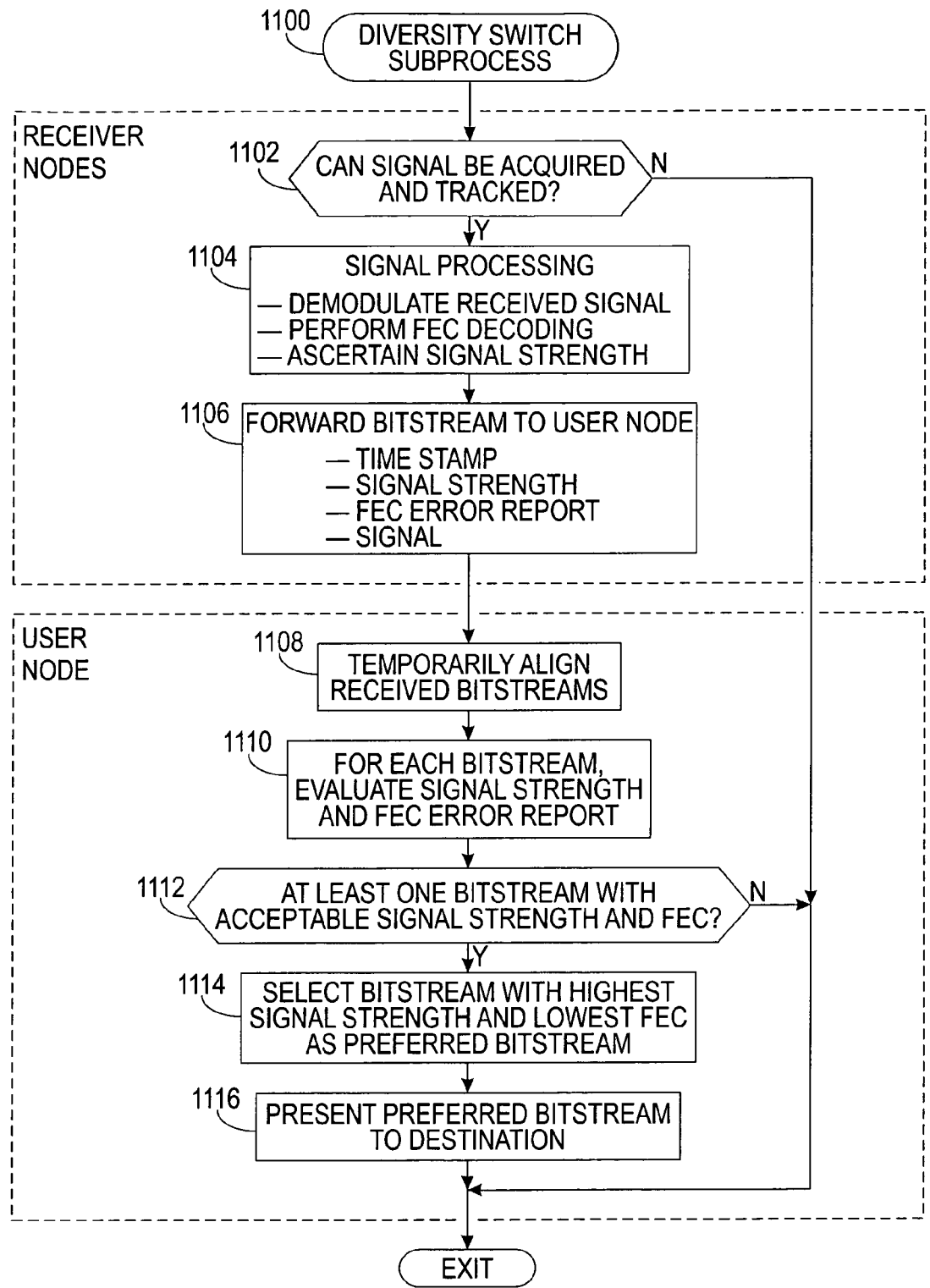
FIG. 11 shows a flow chart of a diversity switch subprocess.

FIG. 11 shows a flow chart of a diversity switch subprocess 1100. In general, diversity switch subprocess 1100 enables user node 608 to select a strongest source signal 604 available received at receiving nodes 602 and present preferred bitstream 610 in accordance with the strongest source signal 604 to destination 612.

Diversity switch subprocess 1100 begins with a query task 1102. Query task 1102 determines whether source signal 604 can be acquired and tracked at receiving node 602. That is, signal quality criteria, such as a received signal strength and a forward error correction (FEC) error report, are evaluated to determine whether the signal quality criteria are within acceptable limits. Generally, the signal strength provides a measure of the strength of source signal 604 received over narrowband channel 104, and the FEC error report provides information regarding the accuracy of the transmission of source signal 604 over narrowband channel 104.

When query task 1102 determines that source signal 604 cannot be acquired and tracked, diversity switch subprocess 1100 exits. Accordingly, receive process 800 cannot utilize diversity switch subprocess 1100 to determine and present preferred bitstream 610 to destination 612. Alternatively, when query task 1102 determines that source signal 604 can be acquired and tracked, process control proceeds to a task 1104.

At task 1104, receiving node 602 performs various tasks associated with signal processing. These tasks include, for example, demodulating received source signal 604, performing FEC decoding, ascertaining signal strength of source signal 604, and so forth.

In response to task 1104, a task 1106 forwards distinct bitstream 606 from receiving node 602 to user node 608 along the established one of communication paths 1002 of wideband backbone 108. Forwarding operations entail, for example, executing the appropriate modulation and processing so that signal 604 can be carried over wideband backbone 108. Distinct bitstream 606 may include a time stamp at start of receive, signal strength, and traffic bits. In an exemplary scenario, time stamp is 20 bits at 1 microsecond resolution, signal strength is in 1 decibel steps, reference −110 dbm every 1 millisecond—7 bits, and traffic bits includes 2 bits, 1 bit being source signal 604 and 1 bit being an erasure mark. The network load on wideband backbone 108 of wireless network 600 for diversity switch receiving mode, for three receivers supporting sixteen kbps channel (25 kHz bandwidth), not counting channel overhead, is approximately 96 kbps.

A task 1108 is performed at user node 608 in response to forwarding task 1106. At task 1108, the received distinct bitstreams 606 are temporally aligned. Temporal alignment calls for synchronizing the received distinct bitstreams 606 in accordance with the time stamp included in each of distinct bitstreams 606. In addition to temporal alignment, task 1108 may perform a known phase comparison technique to determine and null any frequency offsets between the received distinct bitstreams 606.

Following task 1108, a task 1110 evaluates signal quality criteria for each of distinct bitstreams 606. The signal quality criteria may be, for example, signal strength and an FEC error report. The lower the signal strength reaching the receiver the more susceptible it becomes to experiencing noise and/or errors within the received signal. Conversely, the higher the signal strength, the less likely it becomes that errors and/or noise will be experienced.

A query task performed in connection with task 1110 determines whether there is at least one of distinct bitstreams 606 exhibiting a signal strength and FEC error report that is within acceptable threshold limits. When none of distinct bitstreams 606 have signal quality criteria within acceptable threshold limits, diversity switch subprocess 1100 exits. Accordingly, receive process 800 cannot utilize diversity switch subprocess 1100 to determine and present preferred bitstream 610 to destination 612. Alternatively, when query task 1112 determines that at least one of distinct bitstreams 606 has signal quality criteria that falls within acceptable threshold limits, process control proceeds to a task 1114.

At task 1114, user node 608 selects one of distinct bitstreams 606 having the highest signal strength and the lowest FEC error report as preferred bitstream 610. A task 1116 then presents preferred bitstream 610 to destination 612. Following task 1116, subprocess 1100 exits.

Diversity select subprocess 1100 describes the selection of a single one of distinct bitstreams 606 as preferred bitstream 610 for simplicity of illustration. However, in an alternative embodiment, subprocess 1100 may weight and combine distinct bitstreams 606 in accordance with their signal quality criteria (i.e., signal strength and FEC error report) to determine preferred bitstream 610. Weighting and combining is described in connection with a diversity combine subprocess shown in FIG. 13.

FIG. 12

Figure 12:
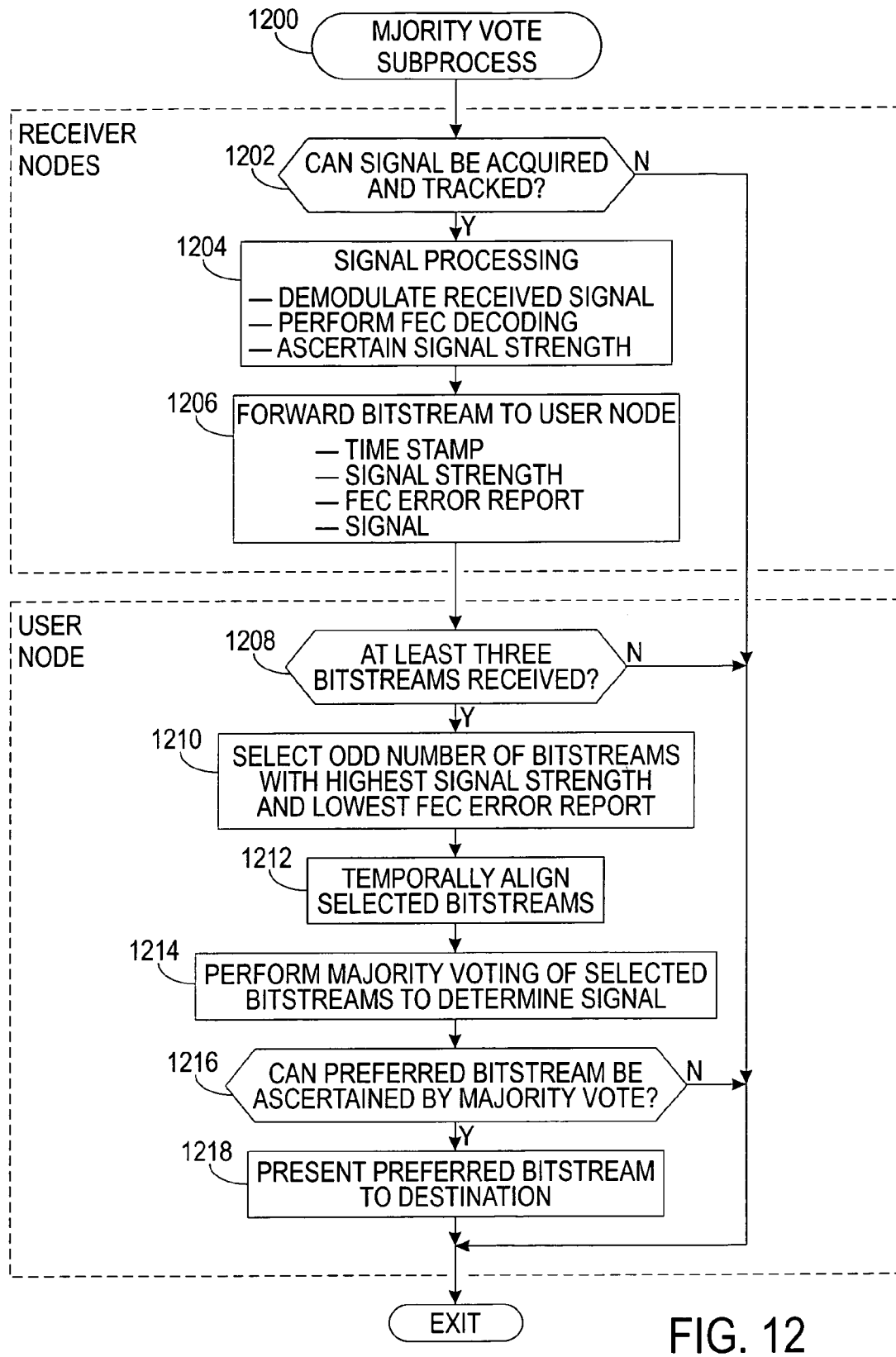
FIG. 12 shows a flow chart of a majority vote subprocess.

FIG. 12 shows a flow chart of a majority vote subprocess 1200. In general, majority vote subprocess 1200 enables user node 608 to perform majority voting of received distinct bitstreams 606 to identify source signal 604, and present preferred bitstream 610 to destination.

Majority vote subprocess 1200 begins with a query task 1202. Like query task 1102, query task 1202 determines whether source signal 604 can be acquired and tracked at receiving node 602. When query task 1202 determines that source signal 604 cannot be acquired and tracked, majority vote subprocess 1200 exits. Accordingly, receive process 800 cannot utilize majority vote subprocess 1200 to determine and present preferred bitstream 610 to destination 612. Alternatively, when query task 1202 determines that source signal 604 can be acquired and tracked, process control proceeds to a task 1204.

Like task 1104, at task 1204, receiving node 602 performs various tasks associated with signal processing. These tasks include, for example, demodulating received source signal 604, performing FEC decoding, ascertaining signal strength of source signal 604, and so forth.

In response to task 1204, a task 1206 forwards distinct bitstream 606 from receiving node 602 to user node 608 along the established one of communication paths 1002 of wideband backbone 108. Forwarding operations entail, for example, executing the appropriate modulation and processing so that signal 604 can be carried over wideband backbone 108. Distinct bitstream 606 may include a time stamp at start of receive, signal strength, and traffic bits. In an exemplary scenario, time stamp is 20 bits at 1 microsecond resolution, signal strength is in 1 decibel steps, reference −110 dbm every 1 millisecond—7 bits, and traffic bits includes 2 bits, 1 bit being source signal 604 and 1 bit being an erasure mark. The network load on wideband backbone 108 of wireless network 600 for majority vote receiving mode, for three receivers supporting sixteen kbps channel (25 kHz bandwidth), not counting channel overhead is approximately 96 kbps. Thus, the network load on wideband backbone 108 for majority vote receiving mode is equivalent to the network load placed on wideband backbone 108 for diversity switch subprocess 1100.

In response to task 1206, a query task 1208 is performed at user node 608. Query task 1206 determines whether at least three distinct bitstreams 606 have been received. When query task 1208 determines that less than three distinct bitstreams 606 were received at user node 608, subprocess 1200 exits. Accordingly, receive process 800 cannot utilize majority vote subprocess 1200 to determine and present preferred bitstream 610 to destination 612. Alternatively, when query task 1208 determines that at least three distinct bitstreams 606 have been received at user node 608, process control proceeds to a task 1210.

At task 1210, user node 608 selects an odd number of distinct bitstreams 606, each of which have the highest signal strength and the lowest FEC error report.

Next, a task 1212 temporally aligns distinct bitstreams 606 selected at task 1210. Temporal alignment calls for synchronizing the selected distinct bitstreams 606 in accordance with the time stamp included in each of distinct bitstreams 606.

A task 1214 then performs majority voting of the selected distinct bitstreams 606 to determine signal 604. Through simple majority voting of the received bits (hence the reason for the odd number) the received source signal 604 can be determined more accurately than determining the received source signal 604 from a single one of distinct bitstreams.

A query task 1216 determines whether preferred bitstream 610 can be ascertained by majority vote. When query task 1216 determines that preferred bitstream 610 cannot be ascertained by majority voting, subprocess 1200 exits. Accordingly, receive process 800 cannot utilize majority vote subprocess 1200 to determine and present preferred bitstream 610 to destination 612. Alternatively, when query task 1216 determines that preferred bitstream 610 can be ascertained, process control proceeds to a task 1218. At task 1218, user node 608 presents preferred bitstream 610 to destination 612. Following task 1218, subprocess 1200 exits.

FIG. 13

Figure 13:
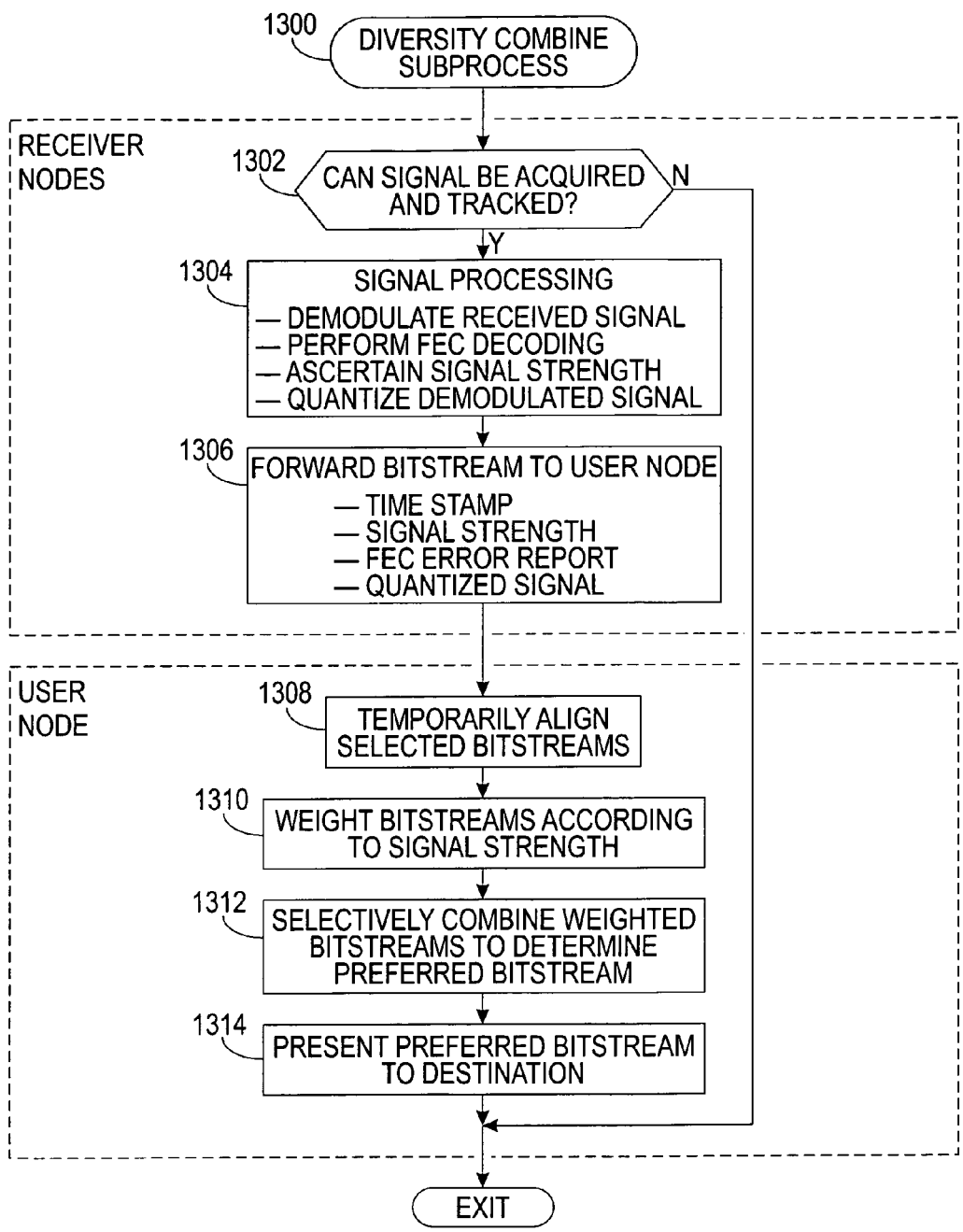
FIG. 13 shows a flow chart of a diversity combine subprocess.

FIG. 13 shows a flow chart of a diversity combine subprocess 1300. In general, diversity combine subprocess 1300 enables user node 608 to combine multiple distinct bitstreams 606 from multiple receiving nodes 602 until acceptable signal quality criteria are satisfied to determine preferred bitstream 610, which is then presented to destination 612.

Diversity combine subprocess 1300 begins with a query task 1302 at which a determination is made whether source signal 604 can be acquired and tracked at receiving node 602. When query task 1302 determines that source signal 604 cannot be acquired and tracked, diversity combine subprocess 1300 exits. Accordingly, receive process 800 cannot utilize diversity combine subprocess 1300 to determine and present preferred bitstream 610 to destination 612. Alternatively, when query task 1302 determines that source signal 604 can be acquired and tracked, process control proceeds to a task 1304.

At task 1304, receiving node 602 performs various tasks associated with signal processing. These tasks include, for example, demodulating received source signal 604, performing FEC decoding, ascertaining signal strength of source signal 604, and so forth. In addition, receiving node 602 quantizes the demodulated source signal 604 with high resolution. Quantization refers to the process of approximating a continuous signal by a set of discrete symbols or integer values. In general, a quantization operator can be represented as:

$$Q(x) = \text{round}(f(x))$$

where x is a real number, Q(x) an integer, and f(x) is an arbitrary real-valued function that controls the 'quantization law' of the particular coder. In digital telephone, two common quantization schemes are the "A-law" and "µ-law", each of which map an analog signal into an interger value represented by an 8-bit binary number, but each with a different function.

In response to task 1304, a task 1306 forwards distinct bitstream 606 from receiving node 602 to user node 608 along the established one of communication paths 1002 of wideband backbone 108. Forwarding operations entail, for example, executing the appropriate modulation and processing so that source signal 604 can be carried on wideband backbone 108 as distinct bitstream 606.

It is known that some received source signals 604 may include many bits per baud, for example, 1024 quadrature amplitude modulation (1024QAM), and some may have few bits per baud, for example, binary phase shift keying (BPSK) or frequency shift keying (FSK). Thus, the number of bits in digitizing source signal 604 may vary on the waveform requiring combining. By way of example, distinct bitstream 606 for QAM is recommended to include time stamp (20 bits at 1 microsecond resolution), signal strength (in 1 decibel steps, reference —110 dbm every 1 millisecond—7 bits), and constellation traffic bits (I-5 bits, and Q-5 bits). In this exemplary situation, the network load on wideband backbone 108 of wireless network 600 for diversity combine mode, for three receivers supporting sixteen kbps channel (25 kHz bandwidth), not counting channel overhead is approximately 480 kbps. This network load is approximately five times greater than the network load imposed by either of the diversity select or majority vote modes.

A task 1308 is performed at user node 608 in response to forwarding task 1306. At task 1308, the received distinct bitstreams 606 are temporally aligned. Temporal alignment calls for synchronizing the received distinct bitstreams 606 in accordance with the time stamp included in each of distinct bitstreams 606. In addition to temporal alignment, task 1308 may perform a known phase comparison technique to determine and null any frequency offsets between the received distinct bitstreams 606.

Next, a task 1310 weights received distinct bitstreams 606 according to signal quality criteria (for example, signal strength and FEC error report) of each of received bitstreams 606. Weighting distinct bitstreams 606 entails assigning a coefficient to each of bitstreams 606 in order to represent their relative importance. As such, one of bitstreams 606 having greater signal strength and lower FEC error report is weighted, or ranked, above one of bitstreams 606 having lower signal strength and higher FEC error report.

Once distinct bitstreams 606 are weighted, a task 1312 selectively combines the weighted distinct bitstreams 606 to determine preferred bitstream 610. That is, task 1312 selects a number of distinct bitstreams 606 for combining in response to their respective weighting coefficients until a signal quality criterion threshold (for example, signal strength) is met or exceeded.

Following task 1312, a task 1314 presents preferred bitstream 610 to destination 612. Following task 1312, subprocess 1300 exits. By combining multiple received distinct bitstreams 606 to determine preferred bitstream 610, hence signal 604, the performance of any single node 102 is enhanced, and quality of service is increased.

FIG. 14

Figure 14:
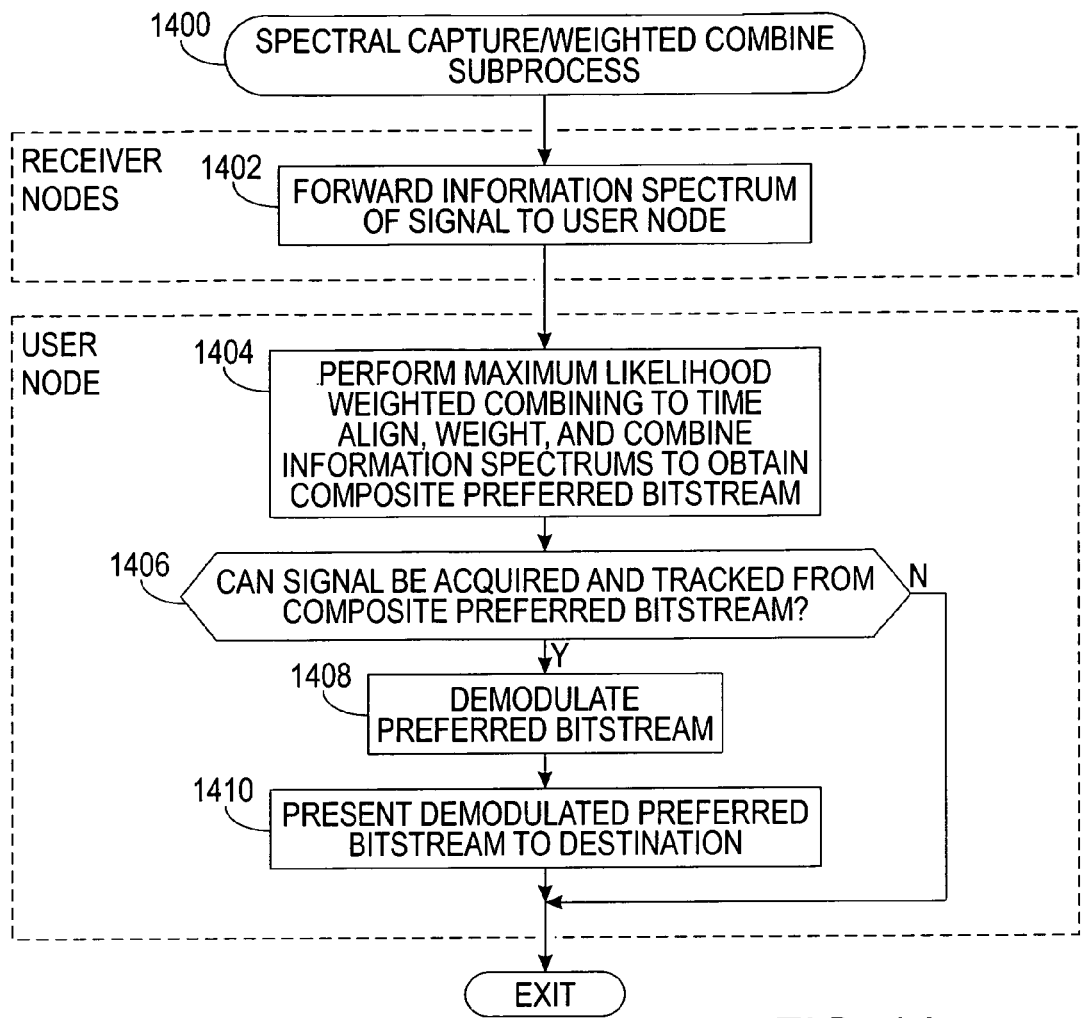
FIG. 14 shows a flow chart of a spectral capture, weighted combine subprocess.

FIG. 14 shows a flow chart of a spectral capture, weighted combine subprocess 1400. In general, spectral capture/ weighted combine subprocess 1400 enables user node 608 to weight and combine information spectrums received at receiving nodes 602 and forwarded to user node 608, prior to acquisition, tracking, demodulating signal 604, and presenting preferred bitstream 610 to destination 612. Accordingly, the execution of spectral capture, weighted combine subprocess 1400 is attempted when receiving nodes 602 cannot acquire and track signal 604.

Spectral capture, weighted combine subprocess 1400 begins with a task 1402. At task 1402, receiving node 602 forwards an entire information spectrum of source signal 604 to user node 608. That is, receiving node 602 detects energy being carried over narrowband channel 104, but cannot acquire and track source signal 604 within the received information spectrum. Such may be the case under the most severe weak signal conditions. Thus, at task 1402, receiving node 602 enables the transmission of the information spectrum from receiving node 602 as distinct bitstreams 606 to user node over wideband backbone 108 of wireless network 600. Typically, a minimum of two and preferably a minimum of three of receiving nodes 602 participate in this operation.

Since the information spectrum has not undergone any correlation filtering processes, a typical oversampling of the desired spectrum on the order of eight to ten times occurs, to support polyphase baud boundary tracking and carrier offset. In this forwarding mode, each receiving node reports automatic gain control (AGC) at 7 bits every 100 ms, and each signal sample at 5 bits I, and 5 bits Q). This results in 10 bps times the sample rate plus 70 bps. For example if a 25 kHz channel is sampled at 200 kbps, and is forwarded at 10 bits/ sample, this results in a network load over wideband backbone 108 of 2 Mbps per receiving node 602. For three receiving nodes 602, this is a composite inflow of 6 Mbps, not counting other network overhead requirements. This network load is over twelve times greater than the network load imposed by the diversity combine mode, and over sixty-two times greater than the network load imposed by either of the diversity select or majority vote modes.

In response to forwarding task 1402, a task 1404 is performed. At task 1404, user node 608 performs maximum likelihood weighted combining to temporally align, weight, and combine the information spectrums conveyed as distinct bitstreams 606 to obtain a composite preferred bitstream 610.

Maximum likelihood is a statistical method for estimating population parameters (as the mean and variance) from sample data that selects as estimates those parameter values maximizing the probability of obtaining the observed data. The result is an effective phased array beam pattern toward the desired source signal 604.

Following task 1404, a query task 1406 determines whether signal 604 can be acquired and tracked from the composite preferred bitstream obtained at task 1404. When query task 1404 determines that source signal 604 cannot be acquired and tracked, spectral capture/weighted combine subprocess 1400 exits. Accordingly, receive process 800 cannot utilize spectral capture/weighted combine subprocess 1400 subprocess 1400 to determine and present preferred bitstream 610 of signal 604 to destination 612. Alternatively, when query task 1406 determines that source signal 604 can be acquired and tracked, process control proceeds to a task 1408.

At task 1408, user node 608 demodulates the composite preferred bitstream 610 obtained at task 1404. Next, a task 1410 presents the demodulated preferred bitstream 610 to destination 612. Following task 1410, spectral capture/weighted combine subprocess exits.

FIG. 15

Figure 15:
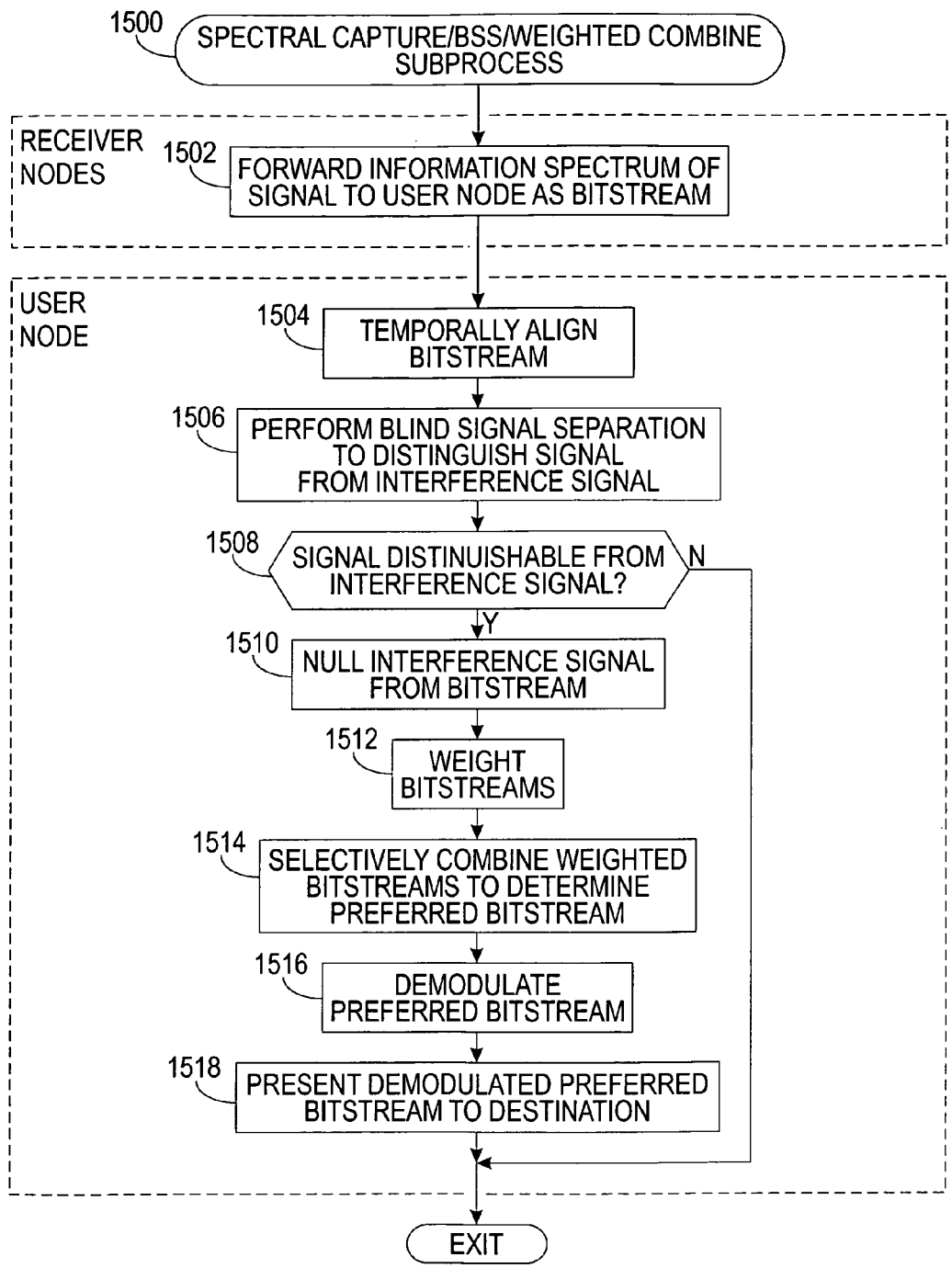
FIG. 15 shows a flow chart of a spectral capture, blind signal separation, weighted combine subprocess.

FIG. 15 shows a flow chart of a spectral capture/blind signal separation(BSS)/weighted combine subprocess 1500. In general, spectral capture/BSS/weighted combine subprocess 1500 enables user node 608 to distinguish source signal 604 from interference in information spectrums received at receiving nodes 602 prior to acquisition, tracking, and demodulating signal 604, and presenting preferred bitstream 610 to destination 612. Accordingly, the execution of spectral capture/BSS/weighted combine subprocess 1500 may be attempted when receiving nodes 602 cannot acquire and track signal 604.

Spectral capture/BSS/weighted combine subprocess 1500 begins with a task 1502. At task 1502, receiving node 602 forwards an entire information spectrum of source signal 604 to user node 608. That is, receiving node 602 detects energy being carried over narrowband channel 104, but cannot acquire and track source signal 604 within the received information spectrum. Such may be the case under jamming signal conditions. Thus, at task 1502, receiving node 602 enables the transmission of the information spectrum from receiving node 602 as distinct bitstreams 606 to user node over wideband backbone 108 of wireless network 600. Typically, a minimum of three of receiving nodes 602 participate in this operation.

Since the information spectrum has not undergone any correlation filtering processes, a typical oversampling of the desired spectrum on the order of eight to ten times occurs, to support polyphase baud boundary tracking and carrier offset. In this forwarding mode, each receiving node reports automatic gain control (AGC) at 7 bits every 100 ms, and each signal sample at 8 bits I, and 8 bits Q). This results in 16 bps times the sample rate plus 70 bps. For example, if a 25 kHz channel is sampled at 200 kbps, and is forwarded at 16 bits/sample, this results in a network load over wideband backbone 108 of 3.2 Mbps per receiving node 602. For three receiving nodes 602, this is a composite inflow of 9.6 Mbps, not counting other network overhead requirements. This network load is over one and a half time greater than the network load imposed by the spectral capture/weighted combine mode. In addition, this network load is approximately twenty times greater than the network load imposed by the diversity combine mode, and approximately one hundred times greater than the network load imposed by either of the diversity select or majority vote modes.

In response to forwarding task 1502, a task 1504 is performed. At task 1504, user node 608 temporally aligns distinct bitstreams 606. In addition to temporal alignment, task 1504 may perform a known phase comparison technique to determine and null any frequency offsets between the received distinct bitstreams 606.

Process control proceeds to a task 1506 where blind signal separation (BSS) is performed to distinguish source signal 604 from interference. BSS is a known technique that recovers unobserved signals, i.e., source signal 604, from several observed mixtures, i.e., from distinct bitstreams of information spectrums. The term "blind" refers to the fact that i) the source signal 604 is not observed (i.e., cannot be tracked and acquired), and ii) no information is available about the mixture (i.e., the combination of source signal 604 and interference).

A query task 1508, performed in connection with task 1506, determines whether source signal 604 is distinguishable from the interference, or jamming, signal. When source signal 604 cannot be distinguished subprocess 1500 exits. However, when source signal can be distinguished at query task 1508, program control flows to a task 1510.

At task 1510, the interference signal is nulled, i.e., subtracted, from distinct bitstreams 604. A task 1512, performed in connection with task 1510 weights distinct bitstreams. Through the execution of the BSS process, both source signal 604 and the interference is tracked, and a feedback weighting loop is used to null the interference, while minimizing the bit error rate (BER) of source signal 604.

Following tasks 1510 and 1512, a task 1514 selectively combines the weighted distinct bitstreams 604 to obtain a composite preferred bitstream 610. That is, task 1514 selects a number of distinct bitstreams 606 for combining in response to their respective weighting coefficients until a signal quality criterion threshold (for example, signal strength) is met or exceeded. The result is an effective phased array beam pattern toward the desired source signal 604 with the interference, i.e., jamming signal, removed.

A task 1516 subsequently demodulates the composite preferred bitstream obtained at task 1514. Next, a task 1518 presents the demodulated preferred bitstream 610 to destination 612. Following task 1518, spectral capture/BSS/weighted combine subprocess 1500 exits.

FIG. 16

Figure 16:
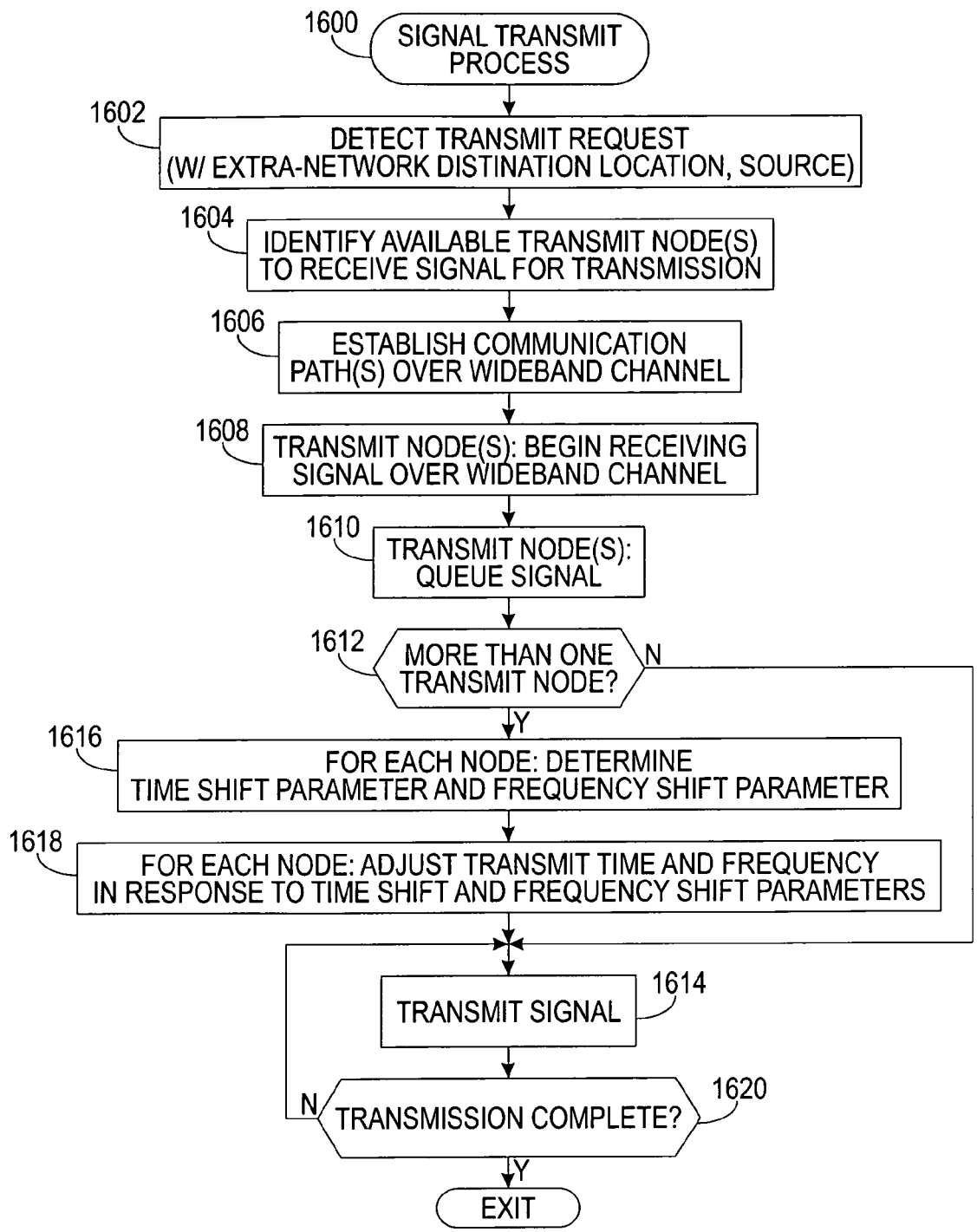
FIG. 16 shows a flow chart of a signal transmit process in accordance with the present invention.

FIG. 16 shows a flow chart of a signal transmit process 1600 in accordance with the present invention. The operations of signal transmit process 1600 will be described utilizing wireless network 700 as an example. However, the present teaching can be applied to wireless networks 100, 400, 500, and 600 as well. Signal transmit process 1600 enables the communication of signal 704 from source 706 to extra-network location 708 via transmitting nodes 712.

Signal transmit process 1600 begins with a task 1602 when a transmit request is detected over wideband backbone 108. The transmit request may have been issued by source 706, user node 702, or a control node (not shown) that manages communications within wireless network 700. The transmit request may contain a particular RF capability 106, in this case UHF SATCOM. In addition, the transmit request may contain addressing for source 706, and location information pertaining to extra-network location 708, or a desired RF coverage area.

A task 1604, performed in connection with task 1602, identifies available transmitting nodes 712. These available transmitting nodes 712 are those nodes 102 whose first software programmable transceiver 200 are currently configured for the particular RF capability 106 (UHF SATCOM). In addition, the available transmitting nodes 712 are those nodes that are likely to be within RF range of extra-network location 708.

Once transmitting nodes 712 have been identified at task 1604, a task 1606 establishes communication paths 1002 over wideband backbone 108, as discussed previously.

Following task 1606, a task 1608 enables each of transmitting nodes 712 to begin receiving distinct bitstreams 710 carrying source signal 704 over broadband channel 108. In response to receipt of bitstreams 710, a task 1610 causes each of transmitting nodes 712 to queue the received bitstreams 710.

Next, a query task 1612 determines whether there is more than one of transmitting nodes 712 available for the transmission of distinct bitstreams 710 of source signal 704. When only one of transmitting nodes 712 is enabled to transmit, process control proceeds to a task 1614. At task 1614, the single transmitting node 712 begins transmitting toward extra-network location 708. When query task 1612 determines that there is more than one of transmitting nodes 712, process control proceeds to a task 1616.

At task 1616, each of transmitting nodes 712 determines a time shift parameter and a phase shift parameter. The time shift parameter adjusts the transmission time of source signal 704 from each of transmitting nodes 712, so that each of source signals 704 carried over each of narrowband channels 104 from each of transmitting nodes 712 arrives at extra-network location 708 in synchronization. Similarly, the phase shift parameter adjusts the phase of signal 704 transmitted from transmitting nodes 712 so that each of signals arrives at extra-network location 708 "in phase" with one another. By synchronizing the transmission time and phase of source signal 704 carried over narrowband channel 104 from each of transmitting nodes 712, signal 704 constructively combines at extra-network location 708 to increase the effective radiated power, and thus significantly increase range.

There are a number of known techniques for determining the time shift parameter and the phase shift parameter for RF signals propagating from multiple locations and combining at a single location. These techniques include, for example, 1) location coordinates, 2) probe response, 3) environmental reference, or 4) random phase selection.

With the first technique, global positioning satellite (GPS) coordinates for each of transmitting nodes 712 and extra-network location 708 may be utilized to compute the time and phase difference parameters for each of the carriers, i.e., narrowband channels 104, that will be synchronized together at extra-network location 708. The second technique entails sending a probe signal from extra-network location 708 toward transmitting nodes 712. The time and phase shift of the probe signal received at transmitting nodes 712 is used to computing the time shift and phase shift parameters back from the probe.

The third technique utilizes an environmental reference, such as a stationary antenna. A reference signal is transmitted from the environmental reference, which is subsequently received at each of transmitting nodes 712. A phase angle can be measured relative to the received reference signal and phase error can be computed. These values are subsequently utilized through triangulation, knowing the location of three transmitting nodes 712 and extra-network location 708, to determine the time shift and phase shift parameters for the transmission of signal 704 to extra-network location. The fourth technique may be employed when the other techniques are unsuccessful. The fourth technique entails determining a random phase and probing extra-network location 708, thus determining time shift and phase shift parameters by trial and error. Regardless of the technique utilized, during transmission transmitting nodes 712 are desirably stationary.

Following the determination of time shift and frequency shift parameters at task 1616, a task 1618 adjusts a transmit time and frequency/phase of signal 704 modulated on narrowband channel 104 from each of transmitting nodes 712.

Next process control proceeds to task 1614 at which multiple transmitting nodes 712 begin transmitting source signal 704 toward extra-network location 708. A task 1620 performed in connection with task 1614 determines whether transmission of source signal 704 is complete. When transmission is not complete process control loops back to task 1614 to continue the transmission of source signal 704. However, when query task 1620 determines that transmission is complete, signal transmit process exits.

In summary, the present invention teaches of a definable radio and a method of operating a wireless network of definable radios. The method and apparatus enable communication with multiple external radio networks operating using disparate RF capabilities. The network of definable radios further allows resources to be shared across the group via the wideband backbone. That is, each two-channel radio can use a different RF capability, can be tuned to a different narrowband channel, and can share information over the wideband backbone. Consequently, each two-channel radio can effectively operate as an N+1 channel radio, where N is the number of radios in the network, to virtually monitor multiple external networks concurrently. In addition, for large amounts of information that is time critical, data can be sent via multiple narrowband channels and recombined on the receiving end, thereby increasing the effective throughput of a single one of the radios by a factor of N radios. The physical separation of external transceivers in different radios resolves issues related to interference caused by transmit power entering the radio through the receive path, and/or isolation problems between circuits residing in a single one of the radios. Furthermore, when looking at a group of nodes as a single virtual node, any single node failure only causes minor degradation in performance because the other nodes continue to operate cooperatively. Moreover, the network of definable radios enables communication with multiple external radio networks without penalties in size, weight, or power.

What is claimed is:

1. A method of operating a wireless network of nodes, said nodes including receiver nodes and a user node, said method comprising:

for each of said nodes, defining a narrowband channel for extra-network communication;

establishing a wideband backbone for intra-network communication between said nodes;

engaging in communication over said narrowband channel at said receiver nodes to carry a signal between said receiver nodes and an extra-network location, said engaging operation including receiving said signal at said receiver nodes;

communicating said signal as distinct bitstreams between said receiver nodes and said user node using said wideband backbone, said communicating operation including forwarding said signal as said distinct bitstreams from said receiver nodes to said user node;

determining, at said user node, a preferred bitstream of said signal from said distinct bitstreams; and presenting said preferred bitstream to a destination.

2. A method as claimed in claim 1 further comprising instructing said receiver nodes to monitor for said signal over said narrowband channel.

3. A method as claimed in claim 1 further comprising:
establishing, prior to said forwarding operation, communication paths between each of said receiver nodes and said destination; and
defining said user node to be a closest common node to each of said receiver nodes along said communication paths.

4. A method as claimed in claim 1 further comprising demodulating said signal at said receiver nodes prior to said forwarding operation.

5. A method as claimed in claim 1 wherein said determining operation comprises:
temporally aligning said distinct bitstreams;
evaluating a signal quality criterion of each of said distinct bitstreams; and
selecting one of said distinct bitstreams in response to said evaluating operation as said preferred bitstream.

6. A method as claimed in claim 1 wherein said determining operation comprises:
temporally aligning said distinct bitstreams; and
ascertaining said preferred bitstream by a majority vote.

7. A method as claimed in claim 6 further comprising regulating a quantity of said receiver nodes used for said majority vote to be an odd number.

8. A method as claimed in claim 1 wherein said determining operation further comprises:
temporally aligning said distinct bitstreams;
weighting said distinct bitstreams according to a signal quality criterion of each of said distinct bitstreams; and
selectively combining said bitstreams in response to said weighting operation to determine said preferred bitstream.

9. A method as claimed in claim 8 wherein said method further comprises:
demodulating said signal at said receiver nodes; and
quantizing said signal at each of said receiver nodes to obtain each of said distinct bitstreams, said demodulating and quantizing occurring prior to said forwarding operation.

10. A method as claimed in claim 8 wherein:
said forwarding operation forwards information spectrums of said signal as said distinct bitstreams; and
said determining operation further comprises demodulating said preferred bitstream.

11. A method as claimed in claim 10 wherein said determining operation further comprises distinguishing said signal from an interference signal within each of said distinct bitstreams prior to said weighting operation.

12. A method of operating a wireless network of nodes, said nodes including receiver nodes and a user node, said method comprising:
for each of said nodes, defining a narrowband channel for extra-network communication;
establishing a wideband backbone for intra-network communication between said nodes;
engaging in communication over said narrowband channel at said receiver nodes to carry a signal between said receiver nodes and an extra-network location;
communicating said signal as distinct bitstreams between said receiver nodes and said user node using said wideband backbone, wherein said communicating operation includes receiving said bitstreams at said receiver nodes from said user node over said wideband backbone;
determining, for said each of said receiver nodes, a time shift parameter and a frequency shift parameter relative to said extra-network location; and
said engaging operation comprises transmitting said distinct bitstreams as said signal from each of said receiver nodes toward said extra-network location, and said transmitting operation comprises adjusting, at said each of said receiver nodes, a transmit time and a transmit frequency of said signal in response to said time shift parameter and said frequency shift parameter to facilitate constructive combining of said signal from said each of said receiver nodes at said extra-network location.

13. A method of operating a wireless network of nodes comprising:
selecting a first RF capability for a first one of said nodes that defines a first narrowband channel for extra-network communication;
selecting a second RF capability for a second one of said nodes that defines a second narrowband channel for said extra-network communication, said first and second RF capabilities being chosen from a group of disparate RF capabilities
receiving, at each of said nodes, configuration information for a chosen RF capability from said group of disparate RF capabilities;
implementing, at said each node, said configuration information to enable said extra-network communication utilizing a narrowband channel defined by said chosen RF capability;
establishing a wideband backbone for intra-network communication between said nodes;
engaging in communication over said second narrowband channel at said second node to carry a signal between said second node and an extra-network location; and
communicating said signal as a bitstream between said first and second nodes using said wideband backbone.

14. A method of operating a wireless network of nodes comprising:
selecting a first RF capability for a first one of said nodes that defines a first narrowband channel for extra-network communication;
selecting a second RF capability for a second one of said nodes that defines a second narrowband channel for said extra-network communication;
establishing a wideband backbone for intra-network communication between said nodes;
engaging in communication over said second narrowband channel at said second node to carry a signal between said second node and an extra-network location;
communicating said signal as a bitstream between said first and second nodes using said wideband backbone;
engaging in communication over said first narrowband channel at said first node to carry a second signal between said first node and a second extra-network location; and
communicating said second signal as a second bitstream between said first and second nodes using said wideband backbone.

15. A method of operating a wireless network of nodes comprising:
selecting a first RF capability for a first one of said nodes that defines a first narrowband channel for extra-network communication;
selecting a second RF capability for a second one of said nodes that defines a second narrowband channel for said extra-network communication;

selecting, for a third one of said nodes, said second RF capability defining said second narrowband channel for said extra-network communication;
establishing a wideband backbone for intra-network communication between said nodes;
engaging in communication over said second narrowband channel at said second node to carry a signal between said second node and an extra-network location; and
communicating said signal as a bitstream between said first and second nodes using said wideband backbone.

16. A method as claimed in claim 15 wherein said bitstream is a first bitstream, and:
said engaging operation comprises receiving said signal at said second and third nodes;
said communicating operation comprises forwarding said signal as said first bitstream from said second node to said first node, and forwarding said signal as a second bitstream from said third node to said first node; and
said method further comprises:
determining, at said first node, a preferred bitstream of said signal from said first and second bitstreams; and
presenting said preferred bitstream to a destination.

17. A method as claimed in claim 16 wherein said determining operation comprises:
temporally aligning said first and second bitstreams;
evaluating a signal quality criterion of each of said first and second bitstreams; and
selecting one of said first and second bitstreams in response to said evaluating operation as said preferred bitstream.

18. A method as claimed in claim 17 wherein further comprising demodulating said signal at said second and third nodes prior to forwarding said first and second bitstreams.

19. A method as claimed in claim 16 wherein:
said method further comprises, selecting, for a fourth one of said nodes, said second RF capability defining said second narrowband channel for said extra-network communication;
receiving said signal at said fourth node over said second narrowband channel;
forwarding said signal as a fourth bitstream from said fourth node to said first node over said wideband backbone; and
said determining operation comprises:
temporally aligning said first, second, and third bitstreams; and
ascertaining said preferred bitstream by a majority vote.

20. A method as claimed in claim 19 wherein further comprising demodulating said signal at said second and third nodes prior to forwarding said first and second bitstreams.

21. A method as claimed in claim 16 wherein said determining operation comprises:
temporally aligning said first and second bitstreams at said first node;
weighting said first and second bitstreams according to a signal quality criterion of each of said first and second bitstreams; and
selectively combining said first and second bitstreams in response to said weighting operation to determine said preferred bitstream.

22. A method as claimed in claim 21 further comprising:
demodulating said signal at said second and third nodes prior; and
quantizing said signal at each of said second and third nodes to obtain said first and second bitstreams prior to said forwarding operation.

23. A method as claimed in claim 16 wherein:
said forwarding operation forwards information spectrums of said signal as said first and second bitstreams; and
said determining operation comprises:
temporally aligning said first and second bitstreams;
weighting said first and second bitstreams according to a signal quality criterion of each of said first and second bit streams;
selectively combining said first and second bitstreams in response to said weighting operation to determine said preferred bitstream; and
demodulating said preferred bitstream.

24. A method as claimed in claim 23 wherein said determining operation further comprises distinguishing said signal from an interference signal within each of said first and second bitstreams prior to said weighting operation.

25. A method of operating a wireless network of nodes comprising:
selecting a first RF capability for a first one of said nodes that defines a first narrowband channel for extra-network communication;
selecting a second RF capability for a second one of said nodes that defines a second narrowband channel for said extra-network communication;
selecting, for a third one of said nodes, said second RF capability defining said second narrowband channel for said extra-network communication;
establishing a wideband backbone for intra-network communication between said nodes;
engaging in communication over said second narrowband channel at said second node to carry a signal between said second node and an extra-network location;
communicating said signal as a first bitstream between said first and second nodes using said wideband backbone, said communicating operation including receiving said first bitstream at said second node from said first node over said wideband backbone;
receiving a second bitstream of said signal at said third node from said first node over said wideband backbone;
determining, for each of said second and third nodes, a time shift parameter and a frequency shift parameter relative to said extra-network location;
adjusting, at each of said second and third nodes prior to said transmitting operation, a transmit time and a transmit frequency of said signal in response to said time shift parameter and said frequency shift parameter to facilitate constructive combining of said signal from said each of said second and third nodes at said extra-network location; and
said engaging operation includes transmitting said first bitstream as said signal from said second node toward said extra-network location.

26. A definable radio for use in a wireless network, said radio comprising:
a first software programmable transceiver configured for extra-network communication using a narrowband channel defined by a radio frequency (RF) capability, said RF capability being chosen from a group of disparate RF capabilities;
a second transceiver configured for intra-network communication over a wideband backbone;
a control processing section in communication with said first and second transceivers, said control processing section enabling said first software programmable transceiver to engage in communication over said narrowband channel to carry a signal between said radio and an extra-network location, and said control processing section enabling forwarding of said signal as a distinct bitstream over said wideband backbone between said second transceiver and a second definable radio, said control processing section extracting said signal from an information spectrum received at said first transceiver over said narrowband channel, converting said signal to said distinct bitstream for forwarding over said wideband backbone, and said control processing section selectively converting said information spectrum received at said first transceiver over said narrowband channel to said distinct bitstream prior to forwarding said distinct bitstream over said wideband backbone.

27. A definable radio for use in a wireless network, said radio comprising:
- a first software programmable transceiver configured for extra-network communication using a narrowband channel defined by a radio frequency (RF) capability, said RF capability being chosen from a group of disparate RF capabilities;
- a second transceiver configured for intra-network communication over a wideband backbone;
- a control processing section in communication with said first and second transceivers, said control processing section enabling said first software programmable transceiver to engage in communication over said narrowband channel to carry a signal between said radio and an extra-network location, and said control processing section enabling forwarding of said signal as a distinct bitstream over said wideband backbone between said second transceiver and a second definable radio, wherein when said second transceiver receives multiple distinct bitstreams of said signal from other definable radios, said control processing section determines a preferred bitstream of said signal from said multiple distinct bitstreams and presents said preferred bitstream to a destination.

28. A definable radio as claimed in claim 27 wherein said control processing section temporally aligns said multiple distinct bitstreams, evaluates a signal quality criterion of each of said multiple distinct bitstreams, and selects one of said multiple distinct bitstreams in response to said evaluating operation as said preferred bitstream.

29. A definable radio as claimed in claim 27 wherein said control processing section temporally aligns said multiple distinct bitstreams and ascertains said preferred bitstream by a majority vote.

30. A definable radio as claimed in claim 27 wherein said control processing section temporally aligns said multiple distinct bitstreams, weights said multiple distinct bitstreams, and selectively combines said multiple distinct bitstreams in response to said weighting operation to obtain said preferred bitstream.

31. A definable radio for use in a wireless network, said radio comprising:
- a first software programmable transceiver configured for extra-network communication using a narrowband channel defined by a radio frequency (RF) capability, said RF capability being chosen from a group of disparate RF capabilities;
- a second transceiver configured for intra-network communication over a wideband backbone;
- a control processing section in communication with said first and second transceivers, said control processing section enabling said first software programmable transceiver to engage in communication over said narrowband channel to carry a signal between said radio and an extra-network location, and said control processing section enabling forwarding of said signal as a distinct bitstream over said wideband backbone between said second transceiver and a second definable radio, wherein said control processing section extracts said signal from information spectrums of distinct bitstreams received at said second transceiver over said wideband backbone, determines a preferred bitstream, and demodulates said preferred bitstream, and said second transceiver presents said preferred bitstream to a destination.

32. A definable radio as claimed in claim 31 wherein prior to demodulation, said control processing section temporally aligns said received bitstreams, weights said received bitstreams according to a signal quality criterion of each of said distinct bitstreams, and selectively combines said distinct bitstreams to obtain said preferred bitstream.

33. A definable radio as claimed in claim 32 wherein prior to weighting said received bitstreams, said control processing section distinguishes said signal from an interference signal within each of said distinct bitstreams.

34. A wireless network comprising:
- a first node selectively configured for extra-network communication over a first narrowband channel utilizing a first radio frequency (RF) capability;
- a second node selectively configured for extra-network communication over a second narrowband channel utilizing a second RF capability, each of said first and second nodes being configured for intra-network communication utilizing a wideband backbone; and
- a third node selectively configured for extra-network communication over said first narrowband channel utilizing said first radio frequency (RF) capability, wherein:
  - a first signal received at said first node over said first narrowband channel is forwarded to said second node over said wideband backbone as a first bitstream;
  - a second signal received at said second node over said second narrowband channel is forwarded to said first node over said wideband backbone as a second bitstream; and
  - when said first signal is received at said third node over said first narrowband channel, said third node forwards said first signal to said second node over said wideband backbone as a third bitstream, said second node determines a preferred bitstream from said first and third bitstreams, and said second node presents said preferred bitstream to a destination.

* * * * *